INVENTORS
PAUL F. ECKELMAN
ROBERT B. HENNIS
RUSSELL H. LARSON
BY
ATTORNEY

CHARACTER RECOGNITION SYSTEM

Filed April 8, 1959 12 Sheets-Sheet 6

United States Patent Office 3,165,717
Patented Jan. 12, 1965

3,165,717
CHARACTER RECOGNITION SYSTEM

Paul F. Eckelman and Robert B. Hennis, Poughkeepsie, and Russell H. Larson, Wappingers Falls, N.Y., assignors to International Business Machines Corporation, New York, N.Y., a corporation of New York Filed Apr. 8, 1959, Ser. No. 804,996
27 Claims. (Cl. 340—146.3)

This invention relates to a character recognition system and more particularly to a multi-channel digital type character recognition system.

Numerous types of character recognition systems have been disclosed including both single channel and multi-channel systems and digital and analog type systems. The present invention is embodied in the type of system employing a plurality of channels linearly scanning a character to be recognized and setting up in a storage matrix by means of the multi-channel outputs, a representation of a character scanned by the multi-channel scanning means. Thereafter, recognition means operates to recognize the character representation set up in the storage matrix.

It is the primary object of the invention to provide a multi-channel character recognition system having a higher degree of reliability and providing a higher degree of discrimination among a greater number of characters than has heretofore been possible in a multi-channel system.

One of the problems commonly encountered in systems of this type is the problem of discriminating between information bearing signals and noise pulses in the output of the scanning means.

A further difficulty commonly encountered in systems of this type, is the difficulty of converting information bearing signals received as the output of scanning means into signals for reliably setting elements of a matrix of storage elements in order to provide an accurate and reliable representation in the storage matrix of the character scanned by the multi-channel scanning means.

It is a further object of this invention to provide apparatus capable of receiving the output signals from the multi-channel scanning means and for reliably converting the information bearing portions of these signals to signals indicating successive "black" and "white" areas of a character bearing surface being scanned by the scanning means, and employing these signals for setting a matrix of storage elements to provide a representation of the character scanned.

A further difficulty encountered in character recognition systems is that the output signals from scanning means must be stored during the time interval during which a character is being scanned and then, during the interval between successive characters, recognition of the stored signals must be accomplished. The limited time interval between successive characters necessitates an undesirably rapid operation of recognition means and thus the selection of recognition apparatus is sometimes limited.

It is a further object of this invention to provide recognition circuitry operating to effectively extend the apparent time interval between successive characters in order to provide a recognition time interval which is actually greater than the time interval between successive characters.

A still further difficulty encountered in multi-channel character recognition systems is that unless the physical relation between a multi-channel reading head and characters to be read is rigidly controlled, the reading head must be provided with a substantially greater number of channels than are necessary to scan the height of a character. Such a multi-channel system employing a storage matrix to set up a character representation of a character scanned must have either a storage matrix channel for each read head channel or channel reduction means to reduce the number of storage matrix channels to the minimum number required to set up a character. In either arrangement, the representation of the character scanned provided in the storage matrix is not necessarily centered therein. Channel reduction is desirably employed to simplify the apparatus and, when channel reduction is used, the upper portion of the character may appear in the lower portion of the matrix and the lower portion of a character may appear in the upper portion of the matrix. This condition requires that the character representation in the matrix be rotated or stepped vertically through the matrix for a number of positions equal to the number of matrix elements to insure that the representation of the character scanned will, at some time during the rolling operation, be centered vertically in order that recognition circuitry may operate to recognize the character represented. This situation results in there being in the matrix a vastly greater number of matrix settings than would otherwise be involved, and accordingly, the recognition problems are greatly increased by the necessity of avoiding false recognition or erroneous recognition when a character is not centered in the matrix.

It is a further object of the invention to provide means for restricting the number of matrix conditions during the vertical rolling of a character representation therein during which recognition circuits are effective in sampling the settings of the matrix registers in an effort to recognize the character represented thereby.

It is still another object of the invention to provide a character recognition system wherein the characters to be recognized are energized by alternating means, and the widths of the lines forming the characters, the rate of character advance and the frequency of said energizing means are so related as to facilitate the recognition of characters from the lines forming the characters.

An additional difficulty in character recognition systems is the problem of recognizing when the scanning means has initially encountered a character and thereafter providing for a determination of the passage of a character interval. This problem is particularly difficult in multi-channel systems if the characters are canted or skewed or if the ink impression of the character has an irregular edge.

Accordingly, it is a further object of the invention to provide means for reliably determining the on-set of a character and for timing a succession of character increments during a character interval which will not be adversely effected by a reasonable amount of character skew.

Other objects of the invention will be pointed out in the following description and claims and illustrated in the accompanying drawings, which disclose, by way of example, the principal of the invention and the best mode, which has been contemplated, of applying that principle.

In the drawings:

FIGURE 1 is a block diagram showing the various component parts of the embodiment of the invention disclosed herein.

FIGURE 2*a* is a timing diagram showing wave forms and time of operation of apparatus during reading of a character.

FIGURE 2*b* is a timing diagram showing time of operation of apparatus during recognition of a character.

Figure 1:
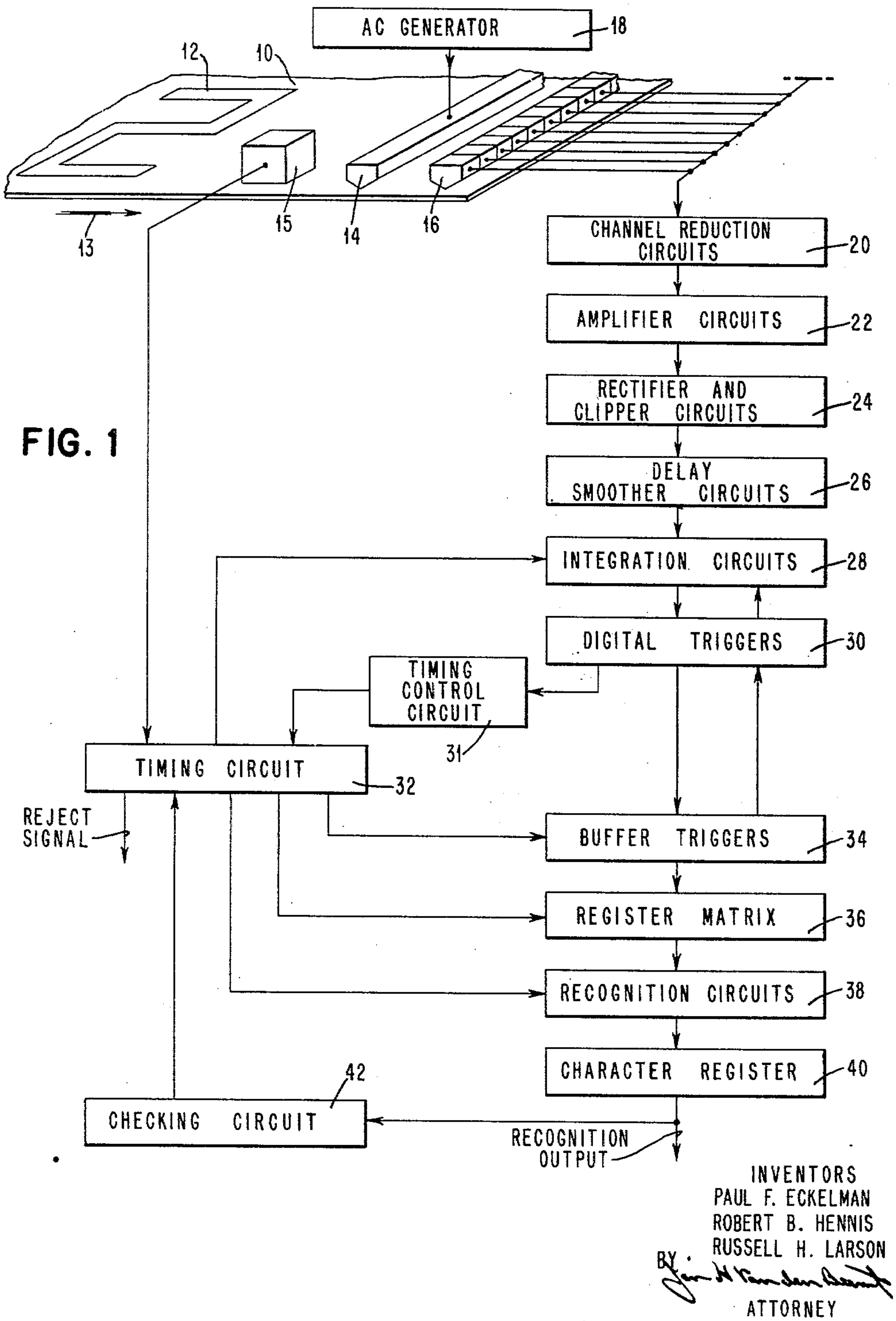
Figure 7:
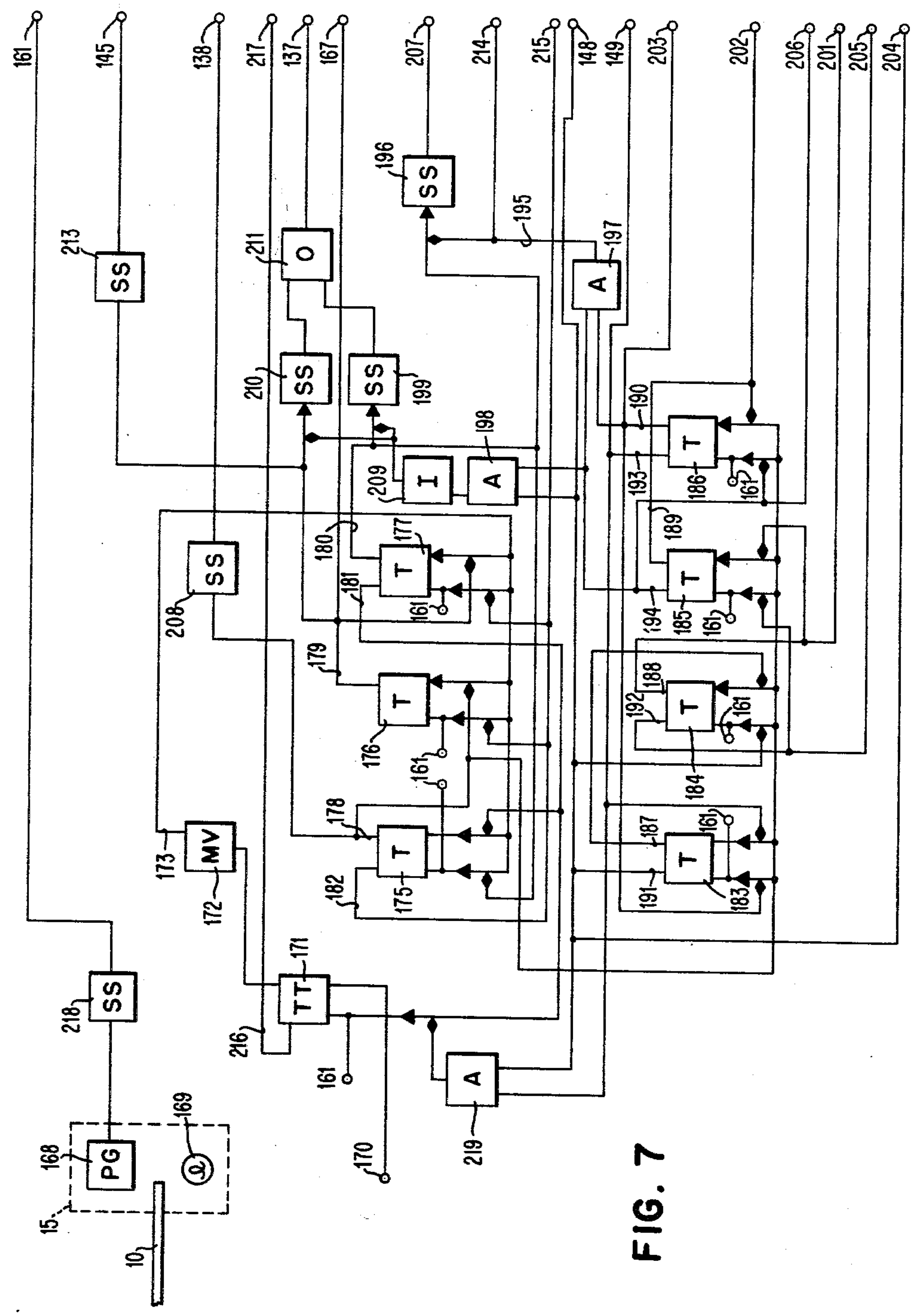
Figure 8:
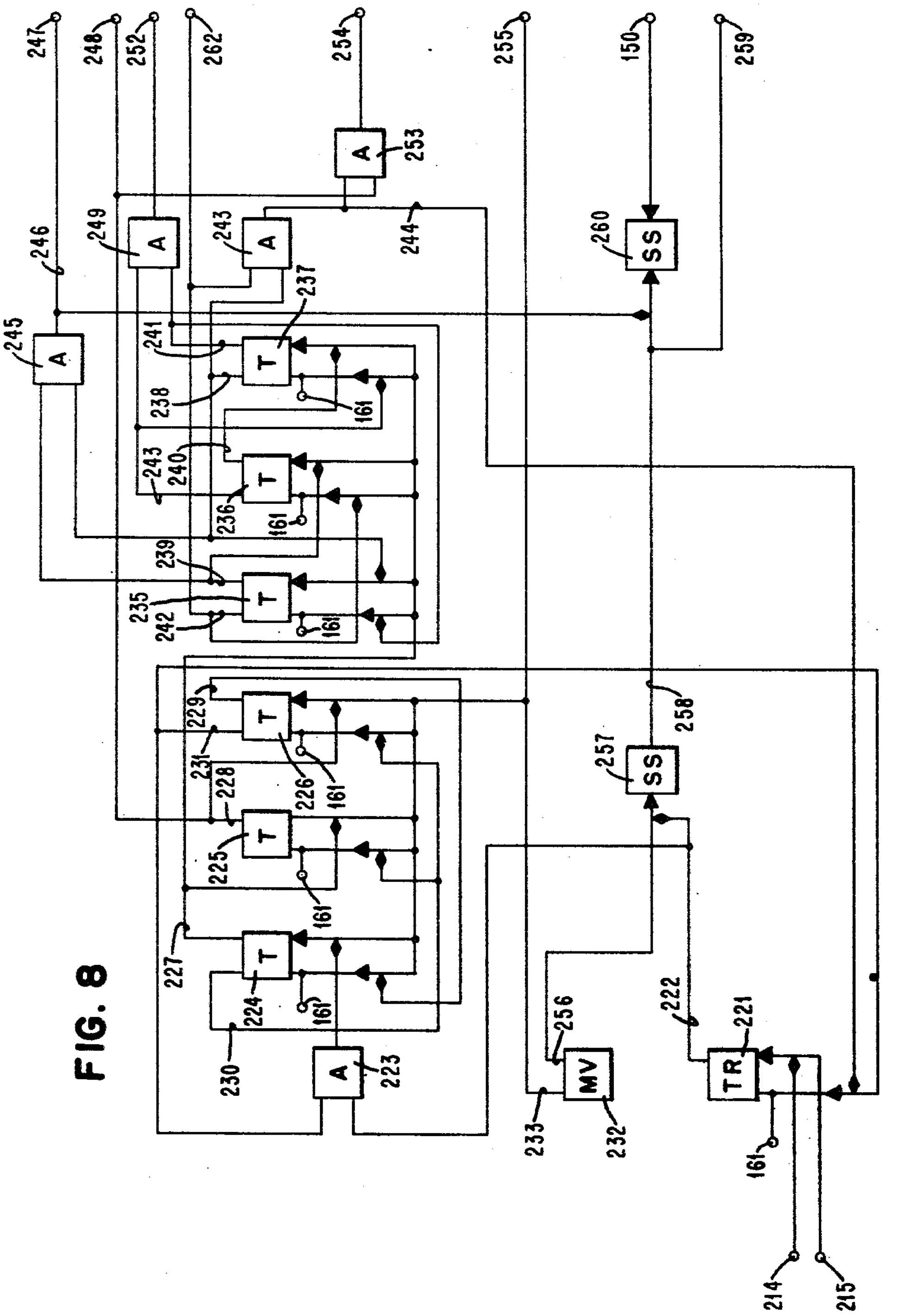
Figure 9:
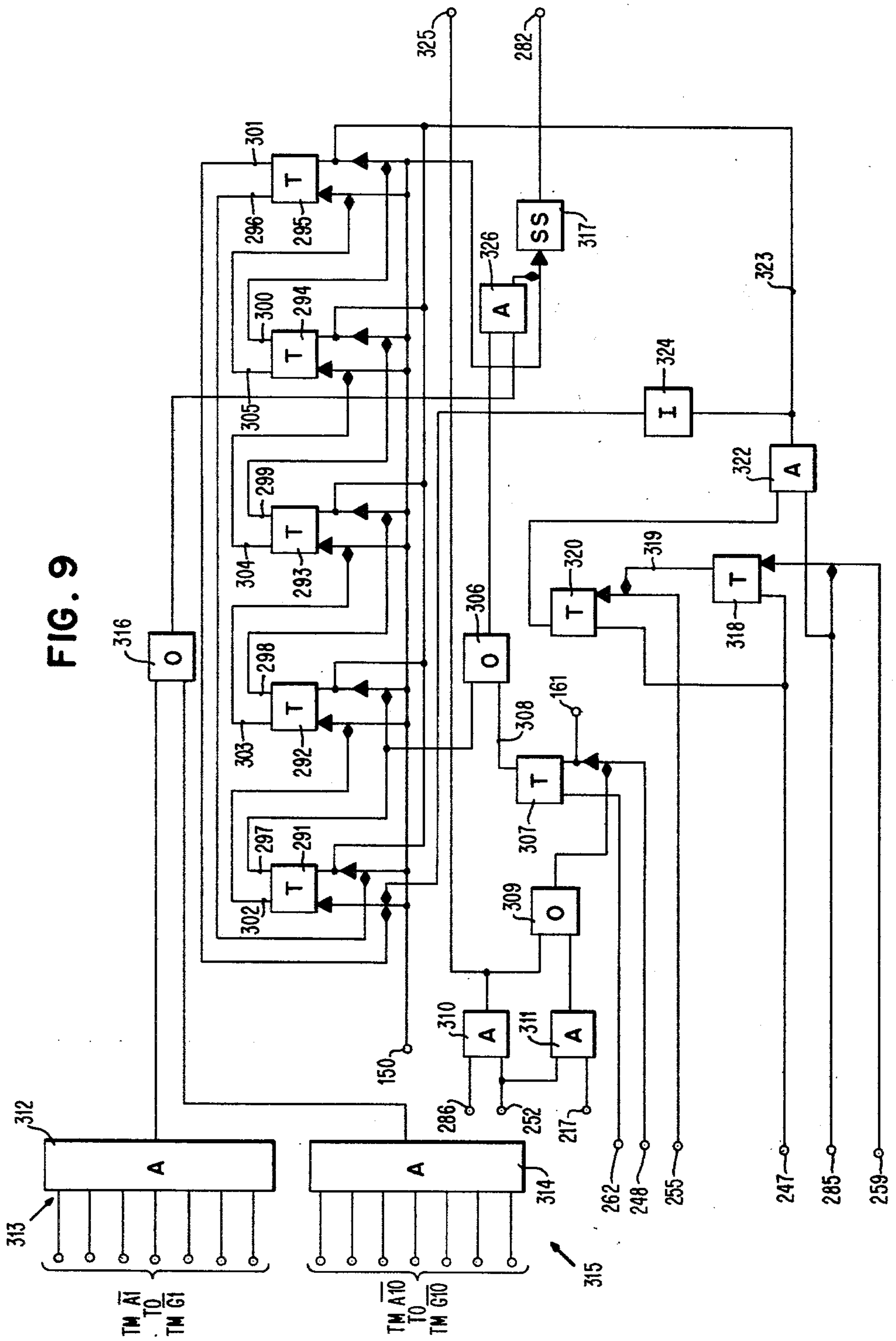

FIGURES 7, 8, and 9 are circuit diagrams of the timing circuit shown in FIGURE 1.

Figure 10:
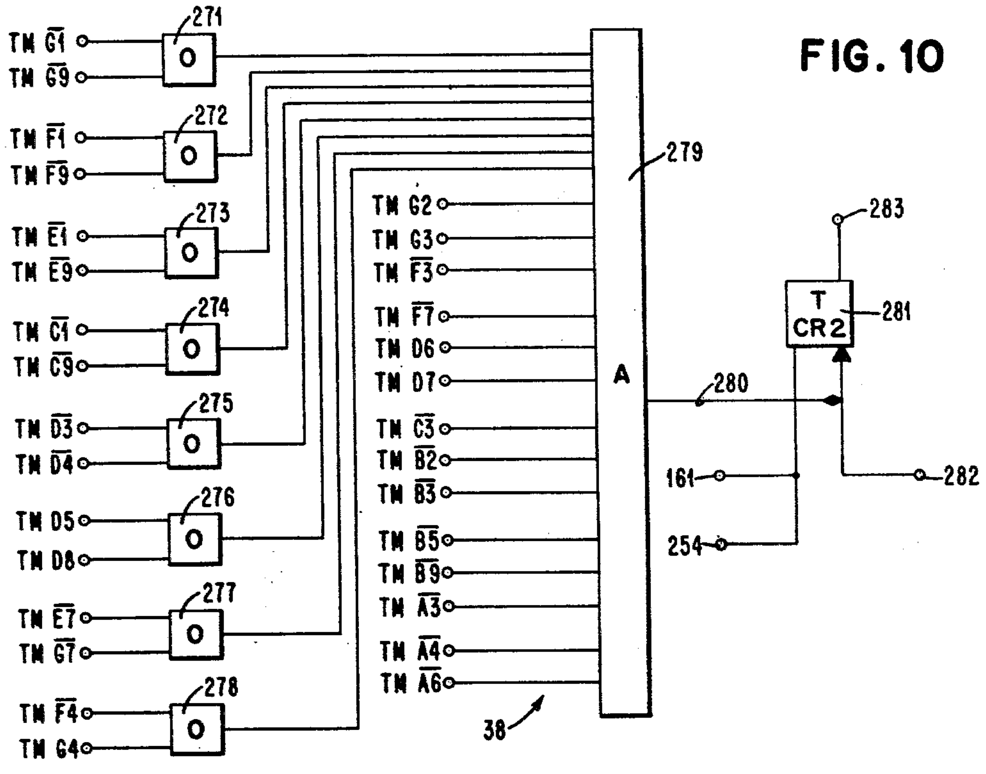

FIGURE 10 is a circuit diagram of a typical recognition circuit.

Figure 11:
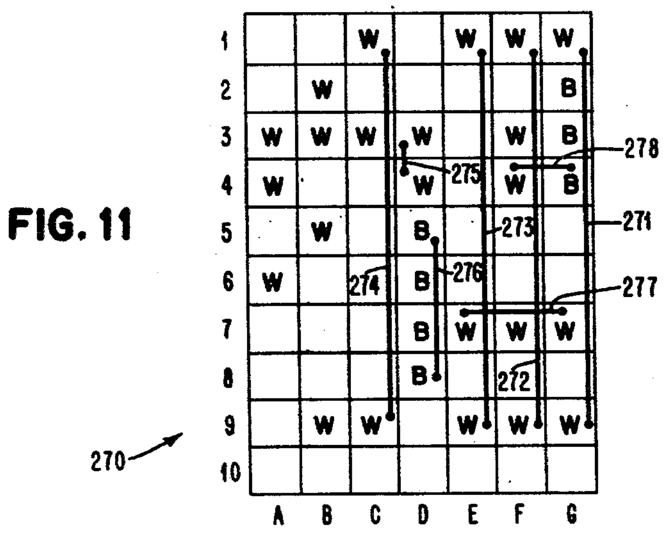

FIGURE 11 is a diagrammatic statement of the circuit of FIGURE 10.

Figure 12:
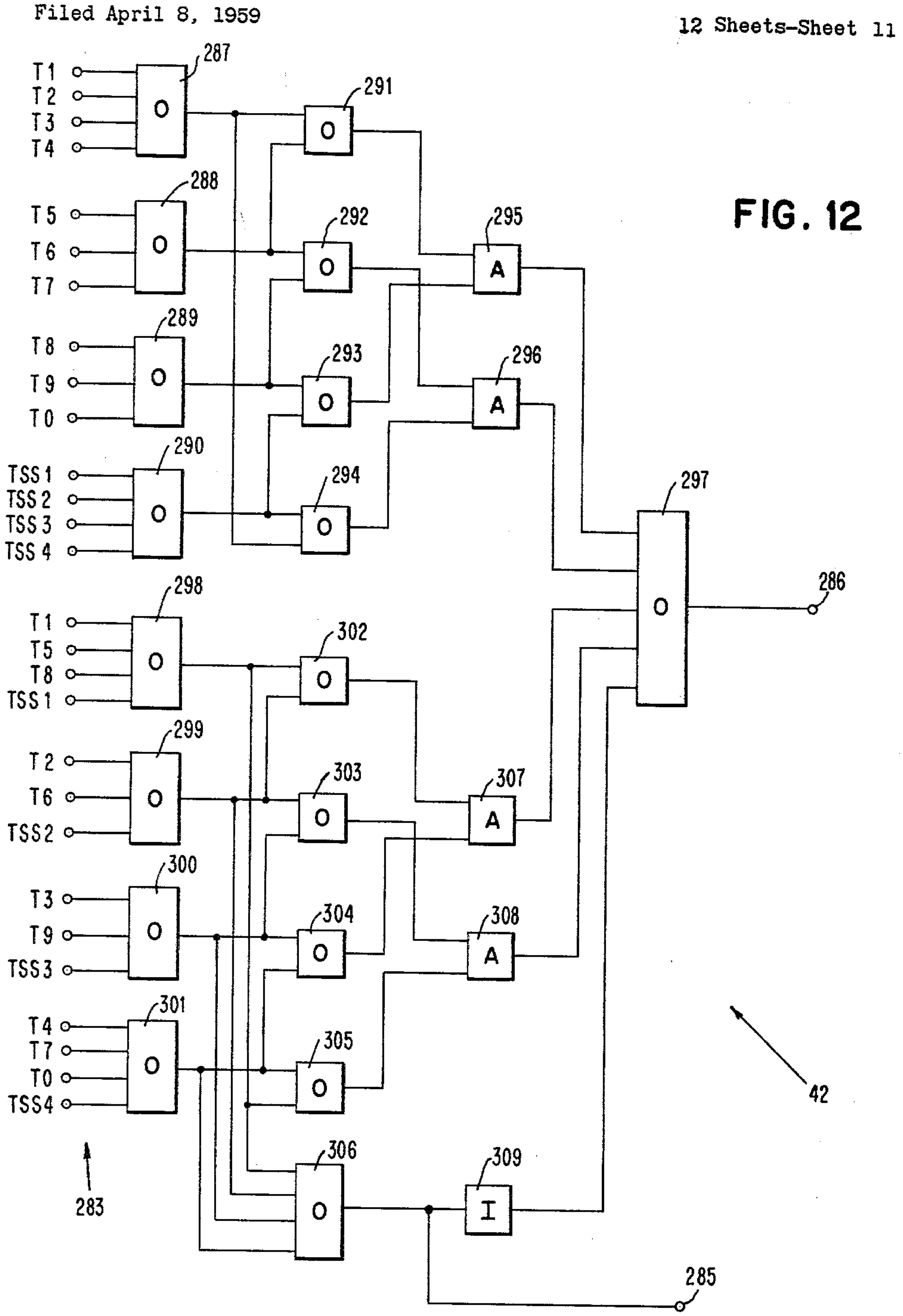

FIGURE 12 is a circuit diagram of the error checking circuit shown in FIGURE 1.

Figure 13:
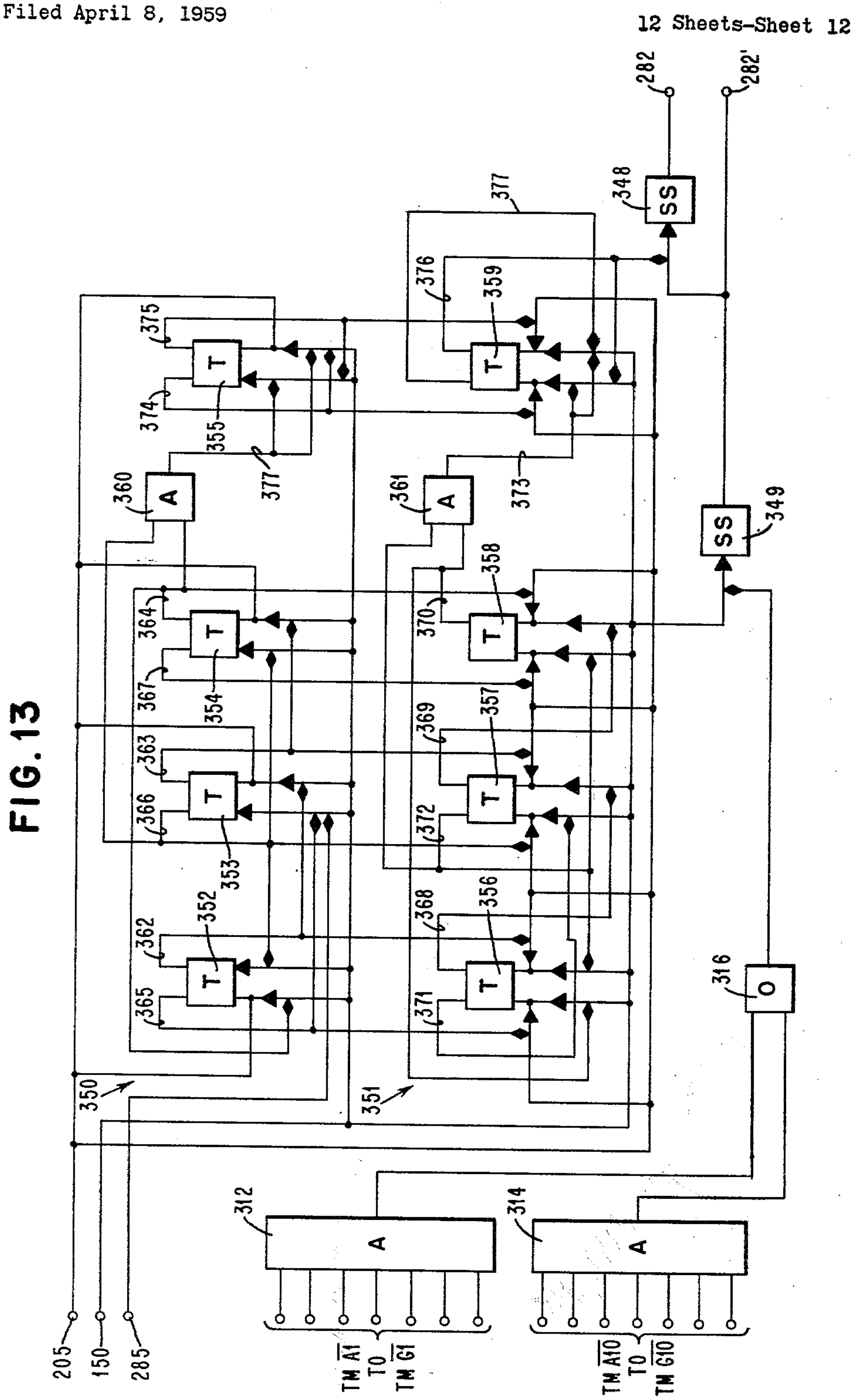

FIGURE 13 is a diagram of a circuit which may be employed in place of the circuit shown in FIGURE 9.

The various elements involved in the embodiment of the invention disclosed herein, will be first described in a general manner in connection with FIGURE 1 and will thereafter be described in greater detail with reference to the remainder of the figures.

In FIGURE 1, there is shown at 10, a fragmentary portion of a document or other surface forming means carrying indicia 12. The indicia shown is in the form of the numeric character "2." The character is printed by means of magnetic ink and is adapted to be sensed by magnetic scanning means.

The document 10 is advanced in the direction of the arrow 13 by any conventional means and the character 12 is carried past magnetic write and read heads 14 and 16, respectively, positioned to scan the character as it passes thereby.

The write head 14 is powered from an A.C. source 18 which may conveniently be, for example, a 30 kc. generator for reasons which will be hereinafter described.

The read head 16 is actually a plurality of read heads positioned adjacent to one another to provide multi-channel scanning of characters passing thereunder. It is desirable to provide write and read heads of sufficient length with respect to the vertical height of the character to be read to insure scanning of the entire height of each character even though successive groups of characters may be displaced vertically with respect to each other or printed on various horizontal lines. Accordingly, a single extended write head is used and, in conjunction therewith, a read head is employed having in the arrangement described a number of heads which is an even multiple of the minimum number of heads desirably employed to fully scan a single character. Outputs from the multi-channel read head 16 are delivered to channel reduction circuits 20.

In the embodiment of the invention described herein, the channel reduction circuits receive outputs from twenty magnetic heads in the read head 16 and reduce these to ten channels for subsequent manipulation. The ten channels represent a sufficient length of the read head 16 to insure the multi-channel scanning of the entire height of a character 12.

As will be evident to one skilled in the art, various types of scanning means may be employed. For example, optical scanning means may be employed to produce output signals substantially identical to those obtained by the magnetic scanning means shown in the drawing. The essential objective is the production of signals on ten channels representing horizontal scanning through a character to be recognized. It will also be evident that the selection of ten channels is arbitrary depending upon the configuration of the characters to be identified as well as the total number of characters to be recognized.

As shown in FIGURE 1, each of the ten channels forming the output from the channel reduction circuits 20, is delivered to an amplifier circuit 22, serving to amplify the signal received. The amplified signals are delivered to rectifier and clipper circuits 24.

Figure 2A:
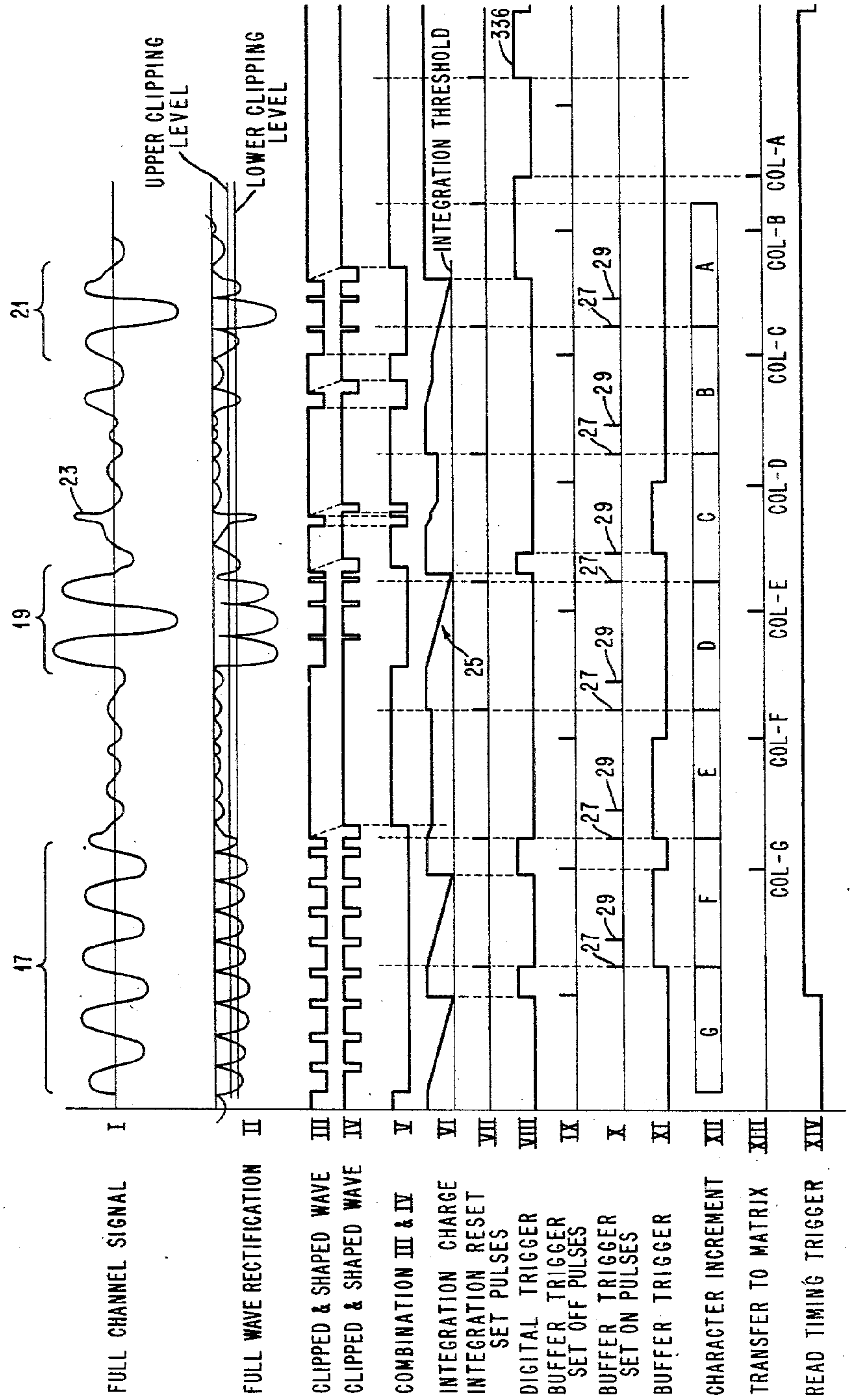

In FIGURE 2*a*, there is shown on line I, a hypothetical example of a signal carried by one of the ten channels. Numeric or other characters to be recognized may be variously formed or stylized and, for any given width of vertical line employed in printing a character, the rate of travel of the document bearing the character and the frequency of the A.C. source powering the write head are desirably selected to provide, when the read head 16 of a given channel crosses a character line, a burst of an A.C. wave of multiples of approximately two cycles duration. In line I of FIGURE 2*a*, there is indicated at 17, a four cycle burst and at 19 and 21 bursts of approximately two cycles each. These portions of the signal are representative of black areas of a character scanned and the portions of the signal between these black areas, are merely noise carrying waves or signals and represent white areas scanned.

For example, stylized characters may be employed having line widths formed of one or more increments of .013 inch in width and the character may be advanced past the read head at such a rate that the line increments of .013 inch pass the read head within 65 microsecond intervals. Under these conditions, if a 30 kc. energizing signal is employed, there will occur two cycles of the 30 kc. signal during passage of each line increment width. Thus, at 19 and 21 in FIGURE 2*a*, the portions of the signal on line I covered by brackets 19 and 21, each represent a black area of one character line increment and the four cycle signal indicated under the bracket 17 represents a black area of two character line increments.

In the rectifier circuits indicated at 24, in FIGURE 1, a full wave rectification is performed, and in the clipper circuits, also indicated at 24, the rectified wave is further amplified and clipped between upper and lower levels. There is passed only the portion of the wave shown between the lines noted as Upper Clipping Level and Lower Clipping Level, in line II of FIGURE 2*a*. The Upper Clipping Level is sufficiently low (in a negative direction) to cut out substantially all of the background noise contained in the signal. The Lower Clipping Level is sufficiently high (in a positive direction) to provide a uniform amplitude level for the information carrying portions of the signal. This clipping is desirable for the reason that various printings which may be printed from various inks and from inks of various thicknesses, and printing variations in individual characters or in successive characters, will give rise to wide variations in amplitude of the output signals from the read heads and, accordingly, wide variations in amplitude of the information bearing portions of the channel signal as shown in FIGURE 2*a*, line I. Furthermore, prior to clipping, the wave was sufficiently amplified that the clipped wave is substantially a square wave. This clipped and shaped wave is shown on line III of FIGURE 2*a*.

The clipped and shaped rectified wave is delivered to a delay smoother circuit 26 in FIGURE 1. This circuit functions to delay the signal pulses and to re-shape the delayed signal pulses as indicated on line IV in FIGURE 2*a*. These delay pulses are then combined by means of an OR circuit with the pulses shown on line III to produce a combination output as shown on line V. As will be evident from line V, the result is extended negative going black indicating pulses which extend for slightly longer periods than their corresponding original 30 kc. signal bursts indicated at 17, 19 and 21 on line I. Between the negative going black indicating pulses are positive going white indicating pulses.

Occasional high level noise pulses will occur in the amplifier output circuits as indicated at 23 in line I of FIGURE 2*a*. If these noise pulses are of sufficient amplitude to pass through the clipping and shaping circuits, they will appear in the signal of line V, and, if a pulse is of sufficiently short duration, it will appear in line V as two individual pulses for reasons which will be hereinafter described.

The black and white indicating pulses shown on line V are fed from the delay smoother circuits to integration circuits 28 in FIGURE 1. The integration circuits are selected to provide for integration progressing to a threshold value, as indicated on line VI of FIGURE 2*a*, within somewhat less than two cycles of the energizing signal shown on line I of FIGURE 2*a*. The integration circuit also provides for successive integrations when a black indicating pulse persists through a plurality of integration time intervals as shown under the bracket 17 in FIGURE 2*a*.

In FIGURE 1, the outputs of the integration circuits 28 are shown as being delivered to digital triggers 30. One trigger is provided for each of the ten channels and the digital trigger in each channel is turned whenever integration in that channel has proceeded to the threshold value. The setting on of a digital trigger by the integrating of line VI of FIGURE 2*a* is indicated on line VIII of FIGURE 2*a*.

The rate at which integration progresses and the threshold level are selected to provide integration to the threshold level in a time interval somewhat less than that of two complete cycles of the 30 kc. energizing wave, thus, integration will pass to the threshold level in less than the time of one character line increment. Upon turning on of a digital trigger, its integration circuit is reset in preparation for a next successive integration cycle.

Each of the ten digital triggers 30, when on, is employed to turn on a respective buffer trigger 34 in its channel. The turning on of each buffer trigger is, however, controlled in the following manner.

Outputs of the digital triggers 30 are delivered to a timing control circuit 31 which acts, when at least two digital triggers are on simultaneously, to initiate operation of a timing circut 32. It is considered, when two of the digital triggers have been turned on by black indications in their respective channels, that this is sufficient evidence of the arrival of a character to be recognized, and the operation of the timing circuit 32 may then be initiated.

Operation of the timing circuit serves to define character increments as indicated by the blocks G–A on line XII of FIGURE 2*a*. Operation of the timing circuit first turns off any of the buffer triggers 34 which may have been left turned on by a previous operation and then except for the latter portion of the A increment and for a controlled time thereafter, turns on the buffer triggers in the channels of any digital triggers which have been turned on. The timing circuit control pulses for turning the buffer triggers off are shown on line IX of FIGURE 2*a*, and the timing circuit control pulses for turnig the buffer triggers on, when their associated digital triggers are on, are shown at 27 in line X. The turning off of a buffer trigger by the pulses of line IX and the turning on of the buffer trigger in accordance with the settings of the digital trigger of line VIII is indicated on line XI of FIGURE 2*a*. It will be observed from FIGURE 2*a*, that except for the latter portion of the A increment and for a controlled time thereafter the digital trigger is turned off by the turning on of its buffer trigger and if, at this time, line V is showing a black signal, the integration cycle will be restarted. During the latter position of the A increment and for a controlled time thereafter, if the digital trigger in a channel is on, the buffer trigger in that channel will not be turned on and the digital trigger will be turned off by means hereinafter described.

As previously noted, the timing pulses controlling the turning on of each buffer trigger by its digital trigger are shown on line X. As will be evident from the portion of line VI, indicated generally at 25, it is possible that integration may be occurring but not have proceeded to the threshold value at the time the corresponding buffer trigger control pulse 27 is generated. This may result from minor irregularities in the printing of the character being scanned. Accordingly, a second or delayed buffer trigger control pulse following each pulse 27 as indicated at 29 on line X, is also generated. Thus, the buffer trigger is turned on at this subsequent time as a result of the digital trigger having been turned on by the completion of the delayed integration cycle following the previous control pulse 27. When the buffer trigger is turned on at the time of a pulse 27 and the digital trigger is, at that time, turned off, the subsequent arrival of a control pulse 29 has no effect on the buffer trigger.

In accordance with the previously described character line width increments and integration cycles, the characters to be identified, may be divided into seven character increments as indicated by the blocks G–A, respectively, on line XII in FIGURE 2*a*. As will be evident from FIGURE 1, the characters are scanned from right to left. Accordingly, the signal in line I in FIGURE 2*a*, represents the passage of the scanning means in this direction over a character. Thus, increment A represents the left hand increment of the character and increment G represents the right hand increment of the character.

The character increments, shown along line XII, are established by timing means in the timing circuit and, following each of the increments G–B and the turning on or non-turning on of the buffer trigger in each channel during that increment, there is provided a control pulse, shown at G–B, on line XIII, controlling the transfer of the setting (on or off condition) of each buffer trigger to a corresponding channel register trigger in a register matrix. Following the A increment, the on or off condition of the digital trigger is transferred to the register matrix by the A control pulse on line XIII.

At the completion of a character time, the triggers of the register matrix 36 are interrogated by recognition circuits indicated at 38 in FIGURE 1, and the outputs of the recognition circuits 38 are delivered to a character register 40. The character register is conveniently in the form of triggers, one representing each of the characters possibly recognized by the recognition circuits.

The outputs of the character register triggers are delivered to any desired utilization apparatus and are also delivered to a checking circuit 42, which checks to confirm the recognition of one character and not more than one character, and generates, in conjunction with the timing circuit 32, a reject signal if less than one character or more than one character is recognized.

In order to provide a maximum time between characters for operation of the recognition circuits and checking circuit, the last transfer, i.e., the transfer of digital trigger settings to the matrix triggers, is advanced in time as indicated by the position of the transfer A timing line on line XIII in FIGURE 2.

After the end of the character interval, all of the digital triggers are turned off and the timing circuit comes to rest awaiting the next character recognition cycle.

There is also provided, as indicated at 15, in FIGURE 1, means for sensing the leading edge of a character bearing surface, such as a card, sheet or other document forming means. The document sensing means 15 serves to provide an output pulse in response to the leading edge of a document and this pulse is employed to insure proper setting of various components of the circuitry, which will be hereinafter described, prior to the commencement of a character reading cycle.

Figure 3:
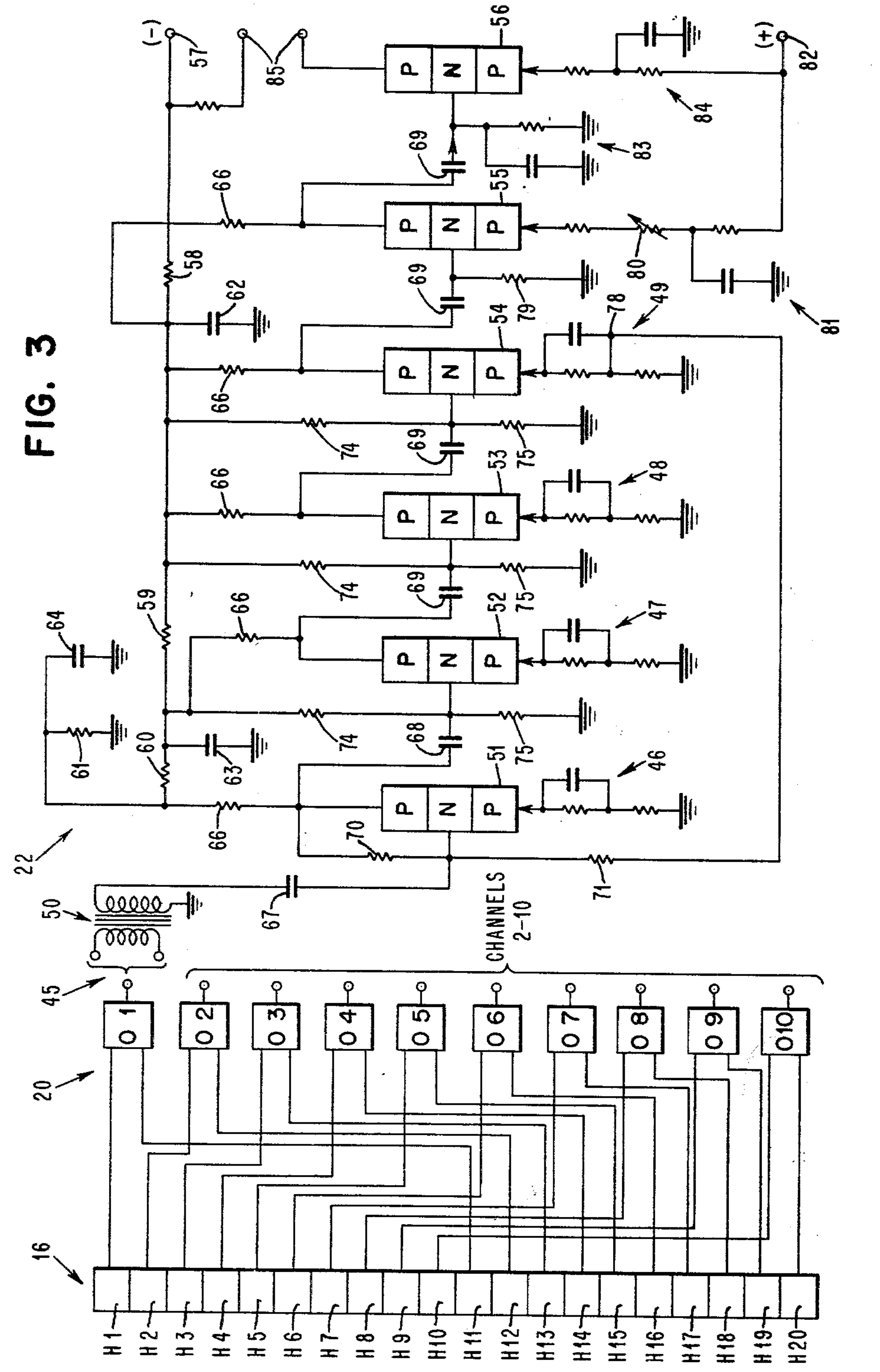
FIGURE 3 is a circuit diagram of the channel reduction circuits and one of the channel amplifier circuits shown in FIGURE 1.

In FIGURE 3, there is shown in greater detail, the multi-channel read head indicated generally at 16, the channel reduction circuits indicated generally at 20 and the amplifier circuit for one channel indicated generally at 22.

In FIGURE 3, there is indicated, generally at 16, twenty read heads H1–H20, respectively. The read heads H1–H10 are connected to OR circuits O1–O10, respectively. The read heads H11–H20, are connected to the OR circuits O1–O10, respectively. Thus, the OR circuits provide outputs for ten channels and these ten outputs are derived from twenty read heads. It will be evident that additional read heads may be employed, which need not be in multiples of ten, in order to provide a more broad scanning width by the read heads while still producing only ten channel outputs for delivery through ten subsequent channel circuits, the only requirement being that characters to be scanned have a vertical height of not greater than ten read heads. It will be evident that this arrangement affords the possibility of the lower half of a character being carried in the outputs of OR circuits 1–5, and the upper half of a character being carried by the outputs of OR circuits 6–10. This possibility will be hereinafter further discussed.

As indicated at 45 in FIGURE 3, the output of OR circuit O1 is delivered to the input side of a coupling transformer 50, serving to couple this OR circuit with an amplifier 22. Each of the other OR circuits O2–O10, have their outputs delivered to an identical amplifier not shown in the drawings.

The channel amplifier 22 is a six stage transistor amplifier employing low currents and low voltages for low noise level operation. The amplifier thus provides a high signal to noise ratio amplification. The amplifier is designed for a mid-frequency of 30 kc. in accordance with the energizing frequency employed in the write head 14.

The amplifier employs six PNP transistors 51–56. A suitable negative potential source is connected at 57 and through a succession of filtering and voltage reduction resistors 58, 59, 60 and 61, providing voltage reduction and filtering of circuit feed-back to provide suitable supply potential to one side of each of the transistor load resistors 66 for transistors 51–55, respectively.

The transistors 51, 52, 53 and 54 each has its emitter biased below ground by means of a resistor capacitor network as indicated at 46–49, respectively.

The base of transistor 51 is biased from the collector by means of a resistor 70 and is coupled through a resistor 71 to a feed-back source, connected at 78 to the emitter bias network 49 of the transistor 54. This feed-back is a degenerative feed-back providing circuit stabilization.

Each of the transistors 52, 53, and 54 has its base biased between its collector supply voltages and ground by resistors 74 and 75, respectively.

The base of transistor 51 is connected to the input transformer 50 by means of a coupling capacitor 67. Transistor 52 has its base coupled to the collector output of transistor 51 through a capacitor 68. The value of this capacitor is selected to provide a desired low frequency response of the amplifier. This low frequency response may be, for example, approximately 3 db down at 1 kc. The successive transistors 53, 54, 55 and 56, each has its base coupled to the collector of the preceding transistor by means of a capacitor 69.

The transistor 55, has its base biased at ground by means of a resistor 79 and its emitter connected through a variable resistor 80 and a resistance capacitor network indicated at 81 to a suitable positive potential source at 82. The variable resistor 80 provides gain control for the amplifier.

The last stage transistor 56 has its emitter coupled to the potential source 82 through a capacitor resistor network indicated at 84 and has its base biased to ground by means of a capacitor resistor network indicated at 83. This latter network provides high frequency roll-off. This roll-off level may be, for example, 3 db down at 60 kc. The amplifier circuit output is taken between the collector of transistor 56 and the potential source 57 at terminals 85 as an A.C. signal. This output may be represented, for example, by the wave shown in line I of FIGURE 2.

Figure 4:
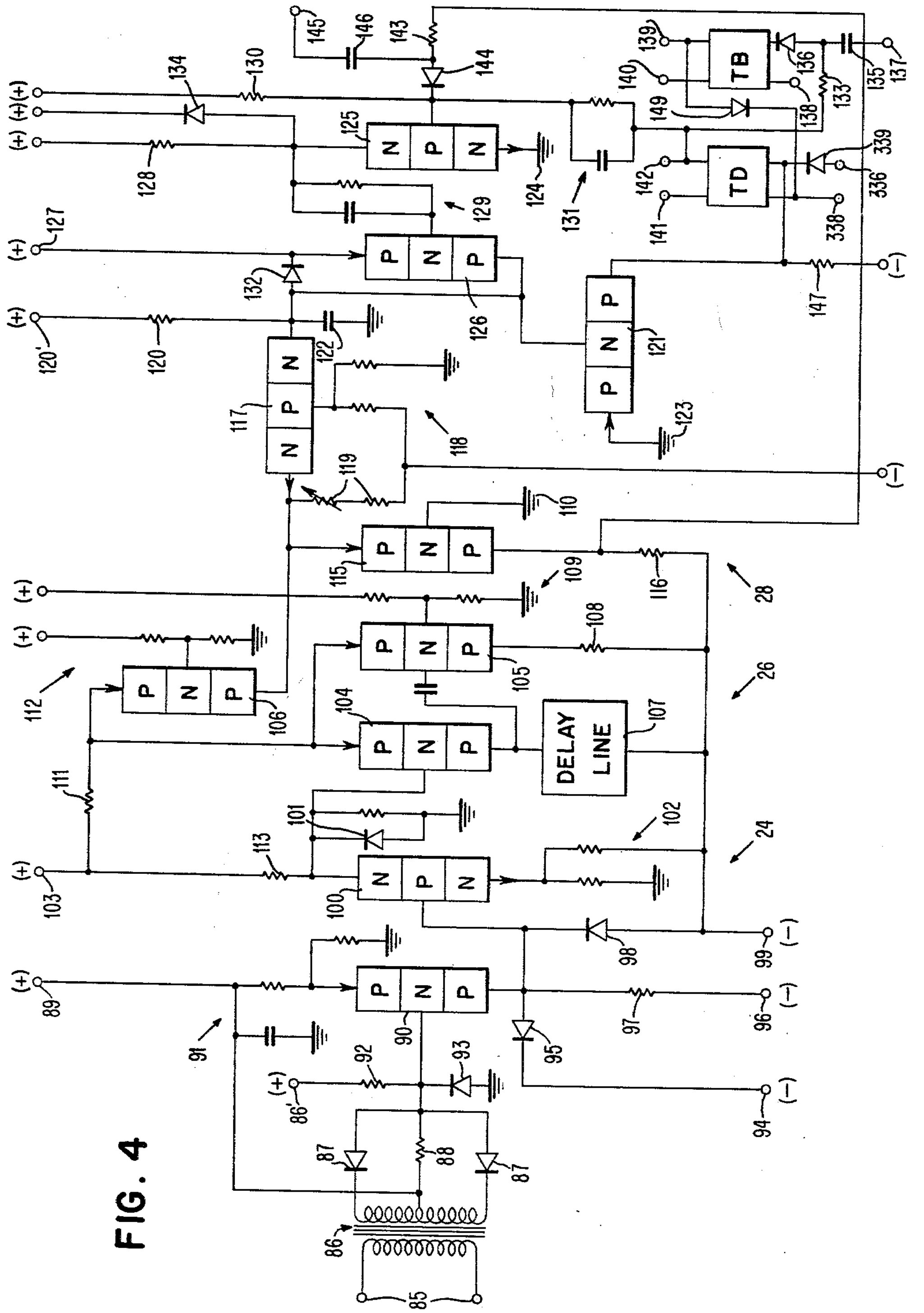
FIGURE 4 is a circuit diagram of the rectifier, clipper, delay smoother and integration circuits and shows the digital trigger and buffer trigger for one of the channels shown in FIGURE 1.

In FIGURE 4, there is indicated generally at 24, one of ten channel rectifier and clipper circuits indicated by the block 24 in FIGURE 1. There is indicated generally at 26, the delay smoother circuit receiving the output of the rectifier and clipper circuits and there is indicated generally at 28, the integration circuit receiving the output from the delay smoother circuit.

The output from terminals 85 of the channel amplifier circuit described in FIGURE 3, is delivered at terminals 85 to the input winding of a coupling transformer 86. The output winding of the transformer is provided with a mid-tap coupled to a resistor 88 and the two ends of the winding are connected to the cathodes of diodes 87. The arrangement forms a full wave rectifier circuit. The mid-tap of the transformer is also connected to a suitable positive potential source at 89.

The output of the rectifier is connected to the base of a PNP transistor 90. The base of transistor 90 is biased to a suitable potential between potential 89 and 86' through the rectifier network 86, 87 and 88 and through resistor 92, and is coupled to the cathode of a diode 93, the anode of which is grounded. The output of the rectifier is in the form of a plurality of negative going half-wave pulses which may, for example, have a base line of +4 volts. The diode 93 serves to clip the negative going peaks of this rectified signal at zero volt level. The resulting wave form is indicated by the portion of the wave form II in FIGURE 2*a*, appearing above the lower clipping level line.

The transistor 90 has its emitter coupled through a bias network indicated at 91 to the voltage supply 89. The emitter of the transistor 90 is biased so that the transistor is normally in an off condition. The input signal to the base must be more negative than a threshold value established by the emitter bias before the transistor will become conductive. Accordingly, the portion of the incoming signal, more positive than a threshold value, will not be passed by the transistor.

Referring again to line II of FIGURE 2*a*, this transistor clipping level is represented by the Upper Clipping Level line of line II. Accordingly, the output of the transistor 90 will be in response to the portion of signal line II lying between the two clipping level lines.

The transistor 90 has its collector output connected to a suitable source by negative potential 96 through a suitable resistor 97 serving to establish a high gain through the transistor. The collector is also connected to the cathode of a diode 98 having its anode connected to a lesser negative voltage source 99. The diode 98 and the voltage of the source 99 limit the negative going output of the transistor. If, for example, the potential at 99 is minus 6 volts, the negative output level limit will be established at minus 6 volts. The collector is also coupled to the anode of a diode 95, the cathode of which is connected to a negative voltage source 94. The negative source 94 is less negative than the negative source 99, and the diode 95 is connected in reverse direction from the diode 98, thus, serving to limit the positive going output of the transistor. The voltage level of 94, may, for example, be minus 4 volts.

The output of transistor 90 is fed to the base of an NPN transistor 100. The transistor 100 has its emitter biased negative by means of a suitable network indicated at 102 connected to the voltage source 99, and has its collector biased positive through a resistor 113 to a source of suitable positive potential at 103. The transistor 100 serves as an amplifier and as an inverter and has its collector output clipped by means of a diode 101 to prevent its output from going more negative than ground. Thus, the output of this transistor has a positive potential base line and information therein is in the form of negative going excursions which do not cross a zero potential value. This output, as shown in wave form III in FIGURE 2*a*, is a squared and clipped signal.

This output from the transistor 100 is fed to the delay smoother circuit indicated generally at 26 in FIGURE 4. This circuit is a current switching circuit and employs three PNP transistors 104, 105 and 106. The transistor 104 has its collector connected to the negative voltage source 99 through a delay line 107. The transistor 105 has its collector biased from the negative voltage source 99 through a resistor 108. The transistor 106 has its base biased between a suitable positive voltage source and ground by a network indicated at 112. The transistor 105 has its base biased between a suitable positive voltage source and ground by means of a network indicated at 109. The emitters of the transistors 104, 105 and 106 are connected together and connected to the positive voltage source 103 through a resistor 111.

As has been previously noted, the information bearing signals are in the form of bursts of a 30 kc. signal. These bursts represent black areas on the document scanned, and white areas are, of course, represented by the absence of 30 kc. signals. The function of the delay smoother circuit is to close the gaps in the rectified shaped 30 kc. signal without adversely affecting the portion of the incoming signal not carrying information, i.e., not carrying the 30 kc. signal.

The circuit including the transistors 104, 105, and 106 accomplishes this closing of the gaps by delaying the input signal and delivering both the input signal and the delayed input signal through an OR circuit which is formed by the transistors 104 and 105 acting in conjunction with the transistor 106. The operation of this circuit will now be described.

Normally, the transistors 104 and 105 are non-conductive and transistor 106 is conductive. If either transistor 104 or transistor 105 becomes conductive, the emitter voltage of transistor 106 is reduced and transistor 106 will become non-conductive. When a rectified clipped 30 kc. signal is received at the base of the transistor 104, this transistor becomes conductive during the zero level periods of the signal, reducing the emitter voltage of the transistor 106 to become non-conductive during these periods.

In order to prevent the transistor 106 from becoming conductive during each positive giving period between rectified shaped 30 kc. half-cycle pulses, the delay line 107 and the transistor 105 are provided. As will be known to those skilled in the art, the delay line 107 serves to provide an apparent impedance change between the collector of the transistor 104 and the negative supply voltage 99, and the change is such as to cause the impedance of the delay line to appear to decrease a predetermined time after the transistor 104 becomes conductive and to appear to increase at the same time interval after the transistor 104 has become non-conductive. This delay line is desirably selected to operate at a time interval equal to approximately one-quarter of the 30 kc. wave length. This time is approximately 8.4 microseconds. Thus, the delay line acts to change the voltage level at the collector of transistor 104, 8.4 microseconds after the transistor 104 has become conductive and 8.4 microseconds after the transistor has become non-conductive.

Insofar as this circuit is concerned, the effective operation of the delay line is at the end of the 8.4 microsecond interval after the transistor 104 has become non-conductive. When the transistor 104 becomes non-conductive, the base of transistor 105 becomes more negative and the transistor 105 conducts until the transistor 104 again becomes conductive or until the end of the 8.4 microsecond interval when the delay line impedance increases. The output of transistor 105 is shown in line IV of FIGURE 2*a*.

As a result of the operation of this circuit, the transistor 106 will be non-conductive during the entire time interval of a burst of rectified 30 kc. signal and will be non-conductive for 8.4 microseconds thereafter. Thus, there is provided a square wave signal representing a black area scanned by the read head. This square wave signal is shown on line V of FIGURE 2.

The 8.4 microsecond extension is added regardless of the length of the black indicating signal received. Accordingly, the 8.4 microsecond extension may be accommodated in the subsequent recognition circuitry.

The output of the transistor 106 is connected to the emitters of PNP transistor 115 and NPN transistor 117.

The integration circuit, indicated generally at 28, comprises the transistor 117 and a PNP transistor 121 acting in conjunction with an integration capacitor 122 as will be hereinafter described.

The collector of transistor 115 is connected through a load resistor 116 to the negative voltage source 99. The emitters of transistors 115 and 117 are connected through load resistors 119 to a suitable source of negative voltage. The base of the transistor 117 is biased negative by means of the resistance network indicated at 118. The base of transistor 115 is connected to ground at 110. The collector output of transistor 117 is connected through a load resistance 120 to a suitable source of positive potential 120'. The integration capacitor 122 is connected between the collector of transistor 117 and grounded.

When transistor 106 is conducting, transistor 115 will be conducting and the voltage of the emitter of transistor 117 will be at ground potential through transistor 115, cutting off transistor 117. When transistor 106 is non-conductive, the emitter voltage of the transistor 117 will be negative as a result of the voltage drop across the resistors 119 and transistor 117 will be conductive.

Normally, as will be hereinafter described, when the transistor 117 is non-conductive, the integration capacitor 122, carries a positive charge, for example, +4 volts. When the transistor 117 becomes conductive, the capacitor 122 is discharged through the transistor 117 at a constant rate as determined by the resistance values of the resistors 119.

The transistor 121 has its emitter connected to ground at 123 and its base connected to the integration capacitor 122 and to the collector of a PNP transistor 126, which at this time, is non-conductive. The potential of the base of transistor 121 will follow the potential across the integration capacitor 122 and when the integration has proceeded to a threshold value, the transistor 121 will become conductive, indicating the completion of an integration. The collector of the transistor 121 is connected to a source of negative potential through a load resistor 147 and to the on-side input terminal of a digital trigger TD. Thus, the trigger TD is turned on when the transistor 121 becomes conductive as a result of the completion of an integration. The trigger TD may be one of various well-known conventional bi-stable triggers capable of being turned on by a positive going pulse.

As previously noted, the integration capacitor potential levels are indicated on line VI in FIGURE 2 and the integration threshold value is indicated thereon. The digital trigger operation is indicated on line VII of FIGURE 2*a*, indicating that the digital trigger is turned on by the completion of an integration to the threshold value.

When the digital trigger TD is turned on, its on-side output taken on line 142 becomes more positive and this output is fed through a resistor capacitor network indicated at 131 to the base of an NPN transistor 125. The transistor 125 has its emitter connected to ground at 124 and its collector connected to a suitable source of positive potential through a resistor 128. The collector of transistor 125 is also connected through a capacitor-resistor network indicated generally at 129 to the base of the transistor 126. The emitter of transistor 126 is connected to the source of positive potential 127 and is connected to the cathode of a diode 132, the anode of which is connected to the integration capacitor 122.

When the base of transistor 125 goes more positive as a result of turning on the trigger TD, the transistor 125 becomes conductive causing the transistor 126 to become conductive, which causes the transistor 121 to become non-conductive and re-charges the integration capacitor 122 from the positive potential supply 127. Thus, when the digital trigger TD is turned on, the integration circuit is reset.

The collector of transistor 125 is connected to a suitable positive potential source through a diode 134 arranged to limit the positive potential rise at the collector of transistor 125.

The on-side output of trigger TD taken on line 142 is delivered to the on-side input of a buffer trigger TB through a resistance 133 and a diode 136 forming in conjunction with a capacitor 135, a gate circuit, as will be hereinafter described.

The circuitry described in connection with FIGURES 3 and 4, represents one channel of the ten channels receiving the outputs of the ten OR circuits indicated generally at 20, in FIGURE 3 As previously noted, each of these ten channels is provided with identical circuitry including a digital trigger and a buffer trigger. As described in connection with FIGURE 1, operation of at least two digital triggers 30 is required to operate the timing control circuit 31 in order to commence operation of the timing circuit 32. Only upon operation of the timing circuit 32 are any buffer triggers 34 turned on in response to their respective digital triggers 30 being on. This timing control is affected by the timing circuit 32 through the gate circuit in the input to trigger TD.

As previously noted, the gate circuit in the input to the on-side of trigger TB involves the use of a diode 136, a resistor 133 and a capacitor 135. The line to the resistor will be referred to as the gate line and the line to the capacitor will be referred to as the set line. It will be evident that the gate line must be positive before a positive going pulse on the set line applied to the capacitor can act through the diode to set the trigger. Accordingly, the gate circuit must be gated before a set pulse can set the trigger.

Accordingly, when a positive going set pulse is received at terminal 137, the trigger TB will be set on only if the trigger TD is on, applying a positive potential to the gate resistor 133.

The on-side output of trigger TB is connected to terminal 139 and to the off-side input of trigger TD, through a diode 149 so arranged that the setting on the buffer trigger will turn off the digital trigger. Turning off of the digital trigger will cause transistors 125 and 126 to turn off. If, at this time, a subsequent integration cycle is not started, the charge on the integration capacitor 122 will be maintained by the diode 132 and resistor 120, the potential at 120' being above the potential at 127.

Referring now to FIGURE 2*a*, the operation of the buffer trigger TB is indicated on line XI, on which the positive going pulses indicate the trigger on condition. The trigger TB is turned off by pulses generated by the timing circuit and indicated on line IX of FIGURE 2*a*. These pulses are applied to the off-side input of trigger TB at terminal 138 in FIGURE 4. Shortly, after TB has been turned off, the pulse indicated at 27 on line X of FIGURE 2*a*, is applied to terminal 137 of the input gate of TB and if its corresponding digital trigger TD is on as indicated by a pulse on line VIII of FIGURE 2*a*, TB will be turned on, turning off TD. This turning off TD results in the initiation of a new integration cycle if a black signal is appearing at the output of transistor 106, as indicated on line V in the region under the bracket 17.

As previously noted, the 30 kc. signal, the character line widths, and the rate of character advance are selected to provide 30 kc. bursts in multiples of two cycles as information bearing signals, and accordingly, the integration time is selected to be approximately two 30 kc. cycles. Thus, the first black time shown in FIGURE 2*a*, under the bracket 17, permits the completion of two integration cycles and hence results in two successive settings of the digital trigger, each with an accompanying setting of the buffer trigger. Thus, during both the character increment G and the character increment F, there was indicated the existence of a black area under the scanning head and at the end of each of these intervals, upon the resetting of the digital trigger, a new integration cycle was started.

The third integration cycle starting at the beginning of character increment E, as indicated at 31, is interrupted above the threshold value because of the termination of the black signal on line V. Thus, the digital trigger is not set during the character interval E.

The end of character increment E occurs during the arrival of a white signal on line V, thus, at this time, the digital trigger is not turned on and the pulse 27 on line X does not set the buffer trigger on.

However, at this time, there is also provided, as indicated on line VII, a timing pulse, which serves to reset the integration circuit. This timing pulse is delivered to terminal 145 in FIGURE 4 and acts through a capacitor 146 and a diode 144 to cause the transistors 125 and 126 to become conductive causing a recharging of the capacitor 122. The duration of the pulse is very short, being only sufficiently long to re-charge the capacitor 122. It is essential to note that, at this time, the transistor 115 is conducting and the potential applied to resistor 143 is at zero level, thus permitting the timing pulse entering at 145 and applied across capacitor 146 to act through the diode gate. When the transistor 115 is not conducting and a negative potential is applied to the resistance 143, a pulse arriving at terminal 145 will not act through the diode gate.

In FIGURE 2*a*, under character increment D, there is shown at 25, an example of an integration in process not having gone to completion at the time a reset pulse arrives at terminal 145. Under these conditions, the reset pulse will not be effective to reset the integration as was described above and the integration proceeds to the threshold level at which time the digital trigger is set, transistors 125 and 126 become conductive and the integration circuit is reset. This occurs, however, after the buffer trigger set pulse 27 on line X. In the event of such a contingency, there is provided the second buffer trigger set pulse, which is indicated at 29 on line X. This second set pulse 29 serves to set on the buffer trigger which is gated by the digital trigger after the occurrence of pulse 27. The setting on of the buffer trigger turns off the digital trigger. This operation is the same as that which resulted from pulse 27, at the ends of character increments G and F, at this character increment C time, however, the signal on line V is indicating white and thus a new integration is not started.

As previously noted, in the diode gate arrangement shown in connection with the on-side input of buffer trigger TB, the input through the resistor 133 provides a gating and must be at zero potential or above to permit a positive going pulse applied at terminal 137 to the capacitor 135 to act to set the trigger to an on condition. Accordingly, the line carrying the resistor 133 is referred to as the gate line and receives a gate signal or pulse whereas the line carrying the capacitor 135 is referred to as the set line and carries the set pulse. The diode 144, resistor 143 and capacitor 146 operate in a similar fashion to limit the control of transistor 125 by timing pulses appearing at terminal 145.

In the circuitry herein described, there are employed conventional bi-stable trigger devices which may be of any of numerous configurations and will be simply referred to as triggers. Similarly, there are employed monostable devices which may be of conventional configuration and will hereinafter be referred to as single shots. There are also employed astable or free running multivibrators which may be of conventional configuration and will merely be referred to as multivibrators. There are also employed AND and OR circuits which may be of conventional configuration. Various power amplifiers as would normally be provided in the circuitry hereinafter described at locations evident to one skilled in the art, have been omitted in order to simplify the drawings and clarify the description. All of these elements are of the type to be actuated by positive going pulses. It should be noted, however, that a negative logic system could be employed in place of the positive logic system described herein.

Some of the elements employ diode gating arrangements such as that described in connection with the buffer trigger TB in FIGURE 4. Accordingly, where a diode gate is employed, the input lines will be referred to as the gate line and the set line without detailed description of the capacitor, resistor, and diode as has been given in connection with the buffer trigger in FIGURE 4, and the gate resistor will be simply indicated by a diamond and the diode indicated by a triangle as in the inputs to the triggers of FIGURE 5. It will be evident that the set line is the unmarked line.

As previously noted, the control pulses arriving at terminal 137, 138, and 145 in FIGURE 4, are produced by the timing circuit 32 in FIGURE 1, and this timing circuit has its operation initiated by the timing control circuit 31 in FIGURE 1 when two digital triggers are set. This timing control circuit is indicated generally at 31 in FIGURE 6.

Figure 6:
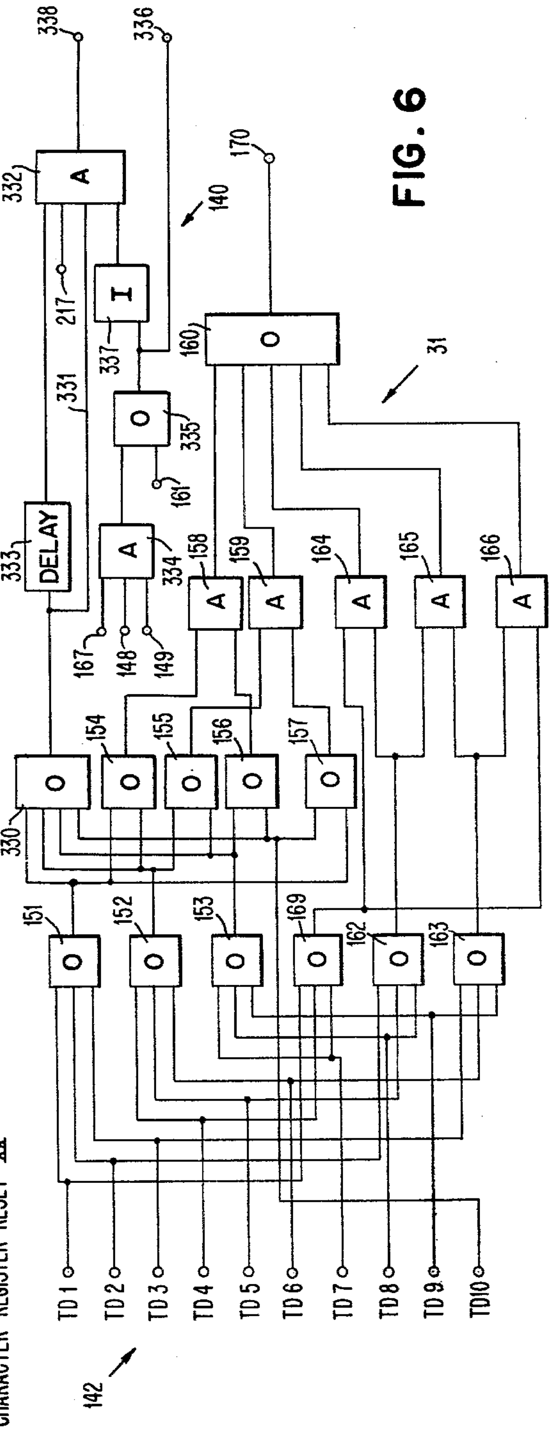
FIGURE 6 is a circuit diagram of the timing control circuit shown in FIGURE 1.

In FIGURE 6, there is indicated generally at 142, terminals connected to the on-side outputs of each of the ten channel digital triggers TD1–TD10. The digital triggers for channels 1, 2, and 3 are connected to input of a three way OR circuit 151. Triggers 4, 5, and 6 are connected to an OR circuit 152 and triggers 7, 8, and 9 are connected to an OR circuit 153. The outputs of OR circuits 151 and 152 are connected to an OR circuit 154. The outputs of OR circuits 152 and 153 are connected to an OR circuit 155. The output of OR circuit 153 and digital trigger 10 are connected to an OR circuit 156. Digital trigger 10 and the output of OR circuits 151 are connected to OR circuit 157. The output of OR circuits 154 and 156 are connected to a two input AND circuit 158, the output of which is delivered to an OR circuit 160. The outputs of OR circuits 155 and 157 are connected to a two input AND circuit 159, the output of which is delivered to the OR circuit 160.

Trigger terminals 1, 4, and 7 are connected to an OR circuit 169. Terminals 2, 5, and 8 are connected to an OR circuit 162, and terminals 3, 6, and 9 are connected to an OR circuit 163. The outputs of OR circuits 169 and 162 are connected to a two input AND circuit 164. The outputs of OR circuits 162 and 163 are connected to a two input AND circuit 165. The outputs of OR circuits 169 and 163 are connected to an AND circuit 166. The outputs of AND circuits 164, 165, and 166 are connected to the OR circuit 160.

The output of OR circuit 160 is taken at terminal 170 and a positive going pulse at this terminal indicates the turning on of two or more digital triggers. This output is used to initiate operation of the timing circuit 32 as will be hereinafter described.

Figure 5:
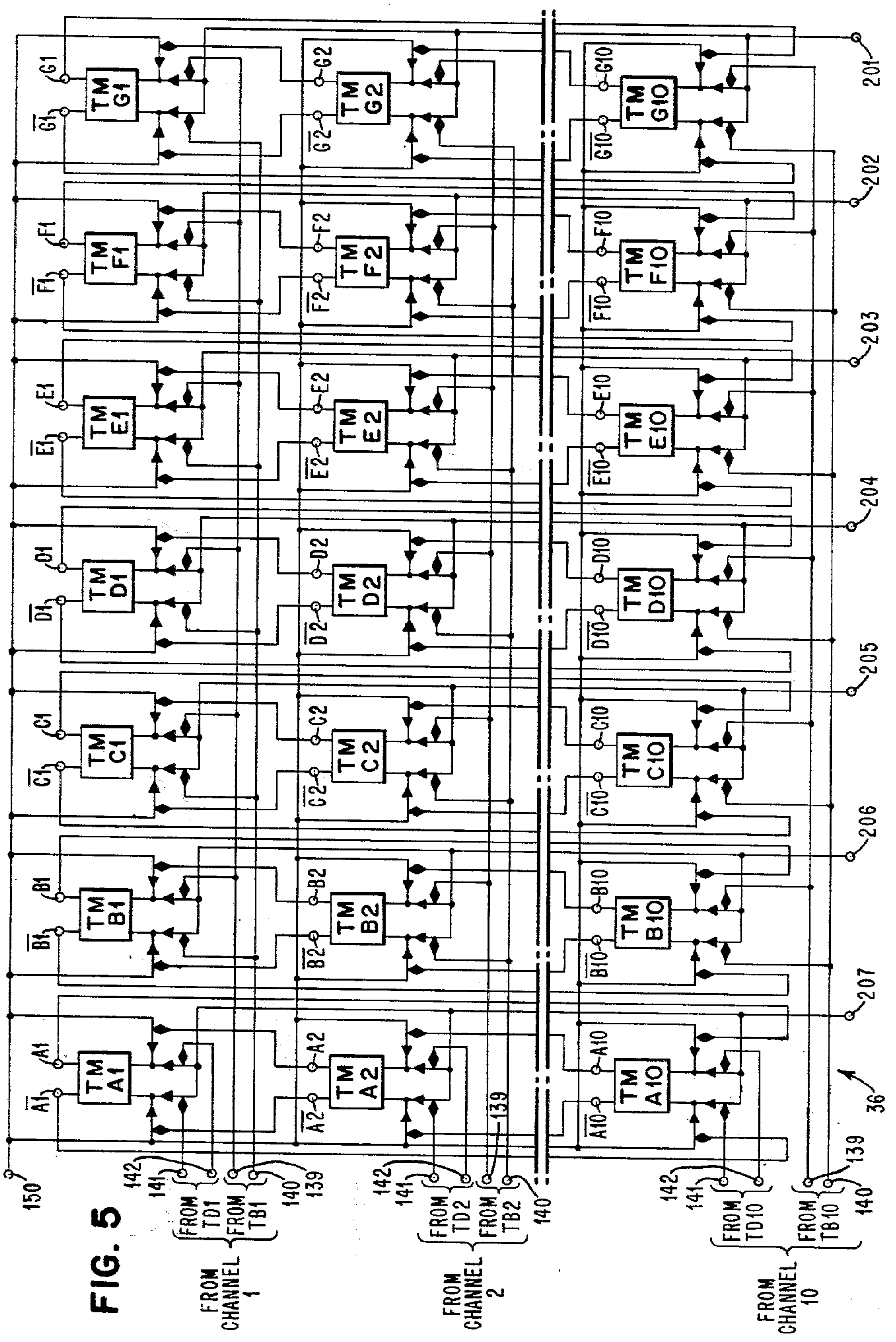
FIGURE 5 is a circuit diagram of the register matrix shown in FIGURE 1.

In FIGURE 5, there is indicated generally at 36, the trigger register matrix referred to in connection with FIGURE 1. The matrix is composed of ten horizontal rows of triggers, one row being provided for each recognition channel previously described. In each row, there are seven triggers corresponding to the seven character increments shown at G–A of line XII in FIGURE 2*a*. Accordingly, the triggers are labeled TMA1–TMG1 from left to right across the top horizontal row, and TMA10–TMG10 from left to right across the bottom horizontal row. The intermediate rows are labeled in accordance with this same code. In FIGURE 5, only the horizontal rows 1, 2, and 10 are shown. It will be evident that the missing rows 3–8 are identical to those shown.

Each of the matrix triggers TMB1–TMG1 in FIGURE 5, receives its on-side input gate pulse from terminal 139 and receives its off-side input gate pulse from terminal 140. These terminals are connected to the on-side output and off-side output, respectively, of the buffer trigger for channel 1. Each of the remaining nine channels of matrix triggers B–G receive similar gate inputs from their respective buffer triggers.

The matrix triggers in the A column receive their on-side input and off-side input gate pulses from terminals 142 and 141, respectively, which are connected to the on-side output and off-side output, respectively, of their respective digital triggers. Thus, the matrix triggers B–G are set in accordance with the setting of their associated buffer triggers and the matrix triggers A are set in accordance with the settings of their corresponding digital triggers.

In FIGURE 5, an input is provided at terminal 150. This input is in the form of ten successive pulses provided by the timing circuit 31 as will be hereinafter described. These are set pulses and are delivered to the on-side input and the off-side input of each of the matrix triggers and for each trigger are gated by the on-side output and off-side output, respectively, of the next lower trigger in the matrix. For example, if TMA2 is off, its off-side output at terminal $\overline{A2}$ gates the set pulse from terminal 150 to the off-side input of TMA1, thus the pulse at 150 set TMA1 off. Similarly, if TMA1 had been on, its on-side output terminal A1 gates the set pulse from terminal 150 to the on-side input of TMA10 setting TMA10 on. This arrangement provides for rolling of information through the matrix as will be hereinafter described.

At terminals 201–207, extending from right to left across the bottom of FIGURE 5, set pulses are provided to the on-side and off-side inputs of each of the triggers in column G–A, respectively. These pulses are provided by the timing circuit as will be hereinafter described and serve to set the triggers of their corresponding rows in accordance with their respective gate controlling buffer or digital trigger settings. Thus, pulses arriving on lines 201–206, control the times of sampling the buffer triggers and pulses on line 207 control the times of sampling of the digital triggers, and the pulses determine the column of matrix triggers performing the sampling.

When the timing control circuit 31 shown in FIGURE 6 provides an output indicating that at least two digital triggers have been set that output serves to initiate operation of the timing circuit 32 shown in detail in FIGURES 7, 8, and 9. The output appearing on the terminal 170 in FIGURE 6, is applied to the on-side input of a read timing control trigger 171, shown in FIGURE 7, turning the trigger to an on condition. The on-side output of trigger 171 controls the operation of a multivibrator 172. The multivibrator is selected to produce five cycles of output during each 65 microsecond character increment.

Three triggers 175, 176, and 177 have gated input circuits and provide a five step ring as will be described. Operation of the ring is started with triggers 175, 176, and 177 off.

The output of multivibrator 172 taken on line 173 is a square wave having an initial positive going pulse. This output on line 173 is delivered to the set lines of the inputs of each of the triggers 175, 176, and 177. The on-side output of trigger 175 taken on line 178 serves to gate the on-side input of trigger 176. The on-side output of trigger 176 taken on line 179 serves to gate the on-side input trigger 177. The on-side output of trigger 177 taken on line 180 serves to gate the off-side input of trigger 175. The off-side output of trigger 175 on line 182 serves to gate the off-side inputs of triggers 176 and 177. The off-side output of trigger 177 taken on line 181 serves to gate the on-side input of trigger 175.

This arrangement provides successive switching of triggers 175, 176, and 177 on successive positive going pulses on the output line 173 of multivibrator 172 starting with all triggers off as follows: T175 on, T176 on, T177 on, T175 off, T176 and T177 off. Thus, there is provided a five step ring, operation of which is first initiated during the first or G character interval by the coming on of two digital triggers. Each cycle of the ring requires a time interval equal to a character interval. Thus while the ring cycles are not coincident with character intervals, the ring operation is used to define character intervals. The ring cycles eight times, i.e., one cycle being initiated after the end of the last or A character interval, under control of the multivibrator 172, whereafter, operation of the multivibrator 172 is arrested by the turning off of trigger 171, as will be described.

A second ring is provided by triggers 183, 184, 185 and 186. The on-side output of trigger 175 taken on line 178 provides set pulses for the gated inputs of each of triggers 183–186. The on-side output of trigger 183, taken on line 187, serves to gate the on-side input of trigger 184. The on-side output of trigger 184 taken on line 188 serves to gate the on-side input of trigger 185. The on-side output of trigger 185 taken on line 189 serves to gate the on-side input of trigger 186. The on-side output of trigger 186 taken on line 190 serves to gate the off-side input of trigger 183. The off-side output of trigger 183 taken on line 191 serves to gate the off-side input of trigger 184. The off-side output of trigger 184 taken on line 192 serves to gate the off-side input of trigger 185. The off-side output of trigger 185 taken on line 194 serves to gate the off-side input of trigger 186. The off-side output of trigger 186 taken on line 193 serves to gate the on-side input of trigger 183.

The eight step ring commences its operation with triggers 183, 184, 185, and 186 off. The first pulse received from the on-side output of trigger 175 serves to set on trigger 183, the second pulse sets on trigger 184, the third pulse sets on trigger 185, the fourth pulse sets on trigger 186, the fifth pulse sets off trigger 183, the sixth pulse sets off trigger 184 and the seventh pulse sets off trigger 185 and the eighth pulse sets off trigger 186.

The coming on of trigger 176 is substantially coincident with the beginnings of character increments F–A. The five steps provided by the five step ring divide each increment into five steps. The eight step ring, executing one step after each five steps of the five-step ring, defines eight five step ring operations. The two rings acting together provide a forty step ring which provides the basic timing for the various control pulses provided by the timing circuit during character reading. At the end of the forty steps, the trigger 171 is set off by a pulse from the off-side output of trigger 177 taken on line 181 and gated by the output of an AND circuit 219 having two inputs one from the off-side output of trigger 183 taken on line 191 and the other from the off-side output on trigger 186 taken on line 193. At this time, all triggers of both rings are off.

As has been previously described, at the end of the first character increment, i.e., character increment G, buffer triggers are set on in those channels in which the digitalization trigger was set on, and, as shown in line XIII of FIGURE 2*a*, a G set pulse occurs during character increment F for setting each matrix trigger in the right hand most or G column of FIGURE 5 to correspond to the setting of the buffer trigger in its channel.

This transfer is accomplished by a pulse provided at terminal 201 in FIGURE 5 and this pulse is taken from terminal 201 of FIGURE 7 and is provided by the on-side output of trigger 184 taken on the line 188. During the E character increment, the settings of buffer triggers existing at the end of the F character increment are transferred to the F column matrix triggers by the F pulse shown on line XIII of FIGURE 2*a* which is delivered to terminal 202 of FIGURE 5 from terminal 202 of FIGURE 7 and is produced by the on-side output of trigger 185 taken on line 189. Similarly, the on-side output of trigger 186 taken on line 190 provides, through terminal 203, the set pulse for column E of FIGURE 5. The off-side output of trigger 183 taken on line 191, through terminal 204, provides the set pulse for the D column of triggers in FIGURE 5. The off-side output of trigger 184 taken on line 192 through terminals 205 provides the set pulse for column C. The off-side output of trigger 185 taken on line 194 taken through terminals 206 provides the set pulses for column B.

In order to increase the effective time between successive characters and to provide a maximum time for functioning of recognition circuits and checking circuits, the last buffer to matrix transfer pulse, i.e., transfer pulse A, shown on line XIII of FIGURE 2*a*, is advanced in time. This advance in time is provided by employing the on-side output of trigger 177 taken on line 180 to a single shot 196 which is gated by a pulse on line 195 from a two input AND circuit 197, which provides an output when both of its inputs occur simultaneously. These inputs are taken from the off-side output of trigger 185 on line 194 and from the on-side output of trigger 186 on line 190. These trigger conditions exist at the same time only when trigger 177 comes on for the first time after the end of character increment A.

As previously described, there is provided on terminal 137 in FIGURE 4, set pulses for setting the buffer trigger TB when the digitalization trigger TD is on. These set pulses are shown on line X of FIGURE 2, as being pairs of pulses 27 and 29. The pulses 27 are produced as follows. The on-side output of trigger 176 taken on line 179 is gated to a single shot 210 by the output from a two input AND circuit 198 passing through an inverter 209. The inputs to the AND circuit 198 are taken from the off-side output of trigger 183 on line 191 and from the off-side output of trigger 185 on line 194. The output of single shot 210 is delivered through an OR circuit 211 to terminal 137.

The pulses 29 are produced as follows. The on-side output of trigger 177 taken on line 180 is gated to a single shot 199 by the output of inverter 209. The output of single shot 199 is delivered through the OR circuit 211 to terminal 137.

The inverted output from the AND circuit 198 occurs following the B set time pulses shown on line XIII of FIGURE 2 and prevents the delivery of any pulses to the single shots 210 or 199 following the B set pulse time. Thus, no pulses 27 or 29 are delivered to terminal 137 in FIGURE 4 after the B set pulse time.

In order to turn off each buffer trigger prior to the end of character increment, pulses are provided on terminal 138. These pulses, shown on line IX of FIGURE 2*a*, are produced by a single shot 208 pulsed by the on-side output of trigger 175 taken on line 178.

The timing pulses employed to reset the integration capacitor when the digital trigger has not been set are provided on terminal 145 and are shown on line VII of FIGURE 2*a*. These pulses are produced by single shot 213 connected to terminal 145 and pulsed by the on-side output of trigger 176 taken on line 179.

The document sensing means 15 previously described in connection with FIGURE 1 is shown in FIGURE 7 as a photocell 168 and a lamp 169 positioned so that documents 10 will pass therebetween. However, the sensing means may also be a mechanical switch actuated device or other means providing an output pulse upon the passage of the leading edge of a document to be scanned. This pulse is a positive going pulse and is fed to a single shot 218, the output of which is delivered to terminal 161 for connection to various triggers throughout the timing circuit to insure proper setting of these triggers when a document arrives at the read heads 16. In FIGURE 7, terminal 161 is connected to the off-side inputs of triggers 171, 175, 176, 177, 183, 184, 185 and 186.

The output of the AND circuit 197 is also delivered to a terminal 214.

The off-side output of trigger 175 taken on line 182, is also delivered to a terminal 215.

The off-side output of trigger 171 taken on line 216 is delivered to terminal 217.

As has been previously described, the read timing control trigger 171 shown in FIGURE 7 is turned on, starting the operation of a timing cycle, by the output of the timing control circuit indicated generally at 31 in FIGURE 6 when two digital triggers TD are simultaneously on indicating the recognition of a black character interval in each of their respective channels. It will be evident that ink spatter and other noise sources between characters or between groups of characters may give rise to signals of sufficient intensity or duration to cause setting of a digital trigger. In order to prevent false acceptance of this type of signal as a character black interval, a time delay system is provided for turning off any of the digital triggers which have been set if a second digital trigger is not set within approximately half a character increment time thereafter. Furthermore, the arrangement prevents the setting on of any of the digital triggers during the last portion of a character interval as determined by the last on period of trigger 176 of the forty step ring described in connection with FIGURE 7.

In FIGURE 6, there is indicated generally at 140, the control circuit for accomplishing this control of the digital triggers. A ten way OR circuit is provided by a four way OR circuit 330 receiving the outputs of the three way OR circuits 151, 152, and 153 and the output of TD10. The output of the OR circuit 330 is delivered through line 331 to one input of a four input AND circuit 332. The output of the OR circuit 330 is also delivered to a delay circuit 333 which provides a second input to the four way AND circuit 332. The delay circuit 333 may be any standard type of delay circuit and is selected to provide a delay of approximately one half of a character time increment. In the particular embodiment of the invention described, this delay would be approximately 30 microseconds.

A third input to the AND circuit 332 is taken from terminal 217 which is connected to the off-side output of the read timing control trigger 171 shown in FIGURE 7. Thus, the circuit indicated at 140 can only be operative during the time interval between character recognition cycles as determined by the read timing control trigger.

The fourth input to the AND circuit 332 is provided by the output of a three way AND circuit 334 fed through an OR circuit 335 and an inverter 337, thus, there can be an output from the AND circuit 332 only when there is no output from the AND circuit 334. The AND circuit 334 has its three inputs connected through terminals 167, 148 and 149, respectively, to the on-side output of trigger 176 and the offside outputs of triggers 183 and 186 shown in FIGURE 7. These three triggers are in their respective on and off conditions as noted above only during the last cycle of operation of the five step ring including trigger 176. Thus, the AND circuit 332 cannot provide an output during this time.

The output of AND circuit 332 is connected through terminal 338 to the off-side input of each of the digital triggers in the manner shown in connection with the digital trigger TD1 in FIGURE 4. A diode 149 prevents feedback from terminal 338 to the circuitry connected to terminal 139 receiving the output of the buffer trigger TB.

The OR circuit 335 receives one input from the AND circuit 334 as previously noted and receives a second input from the document sensing means from terminal 161. The output of the OR circuit 335 in addition to being delivered to the inverter 337 is delivered to terminal 336 which is connected to the on-side input of each of the digital triggers as shown in connection with the digital trigger TD1 in FIGURE 4. This input is, however, connected through a diode 339 providing feedback from the integration circuit to the circuit indicated at 140 in FIGURE 6.

The AND circuit 332 can produce an output only when the read timing trigger 171 is off. Accordingly, this circuit is operative only during intervals between characters. During the interval between characters, there will be no output from the AND circuit 334 thus there will be a positive output from the inverter 337. Therefore, during this time interval the AND circuit 332 is controlled by the OR circuit 330 and the delay line 333. If during this time interval, i.e., the interval between characters or before the sensing of a first character black increment, a digital trigger comes on, 30 microseconds thereafter an output from delay line 333 will be delivered from the AND circuit providing the fourth input to the AND circuit. The resulting output from the AND circuit will turn the digital trigger off and the improperly operated digital trigger is restored to an off condition. If, on the other hand, before the expiration of the 30 microsecond time delay, a second digital trigger has come on, the read timing control trigger will be turned on and the input to the AND circuit 332 at terminal 217 will go off. Thus, the coming on of the second digital trigger indicating the on set of a character prevents the occurrence of an output from AND circuit 332.

A further function of the circuit indicated at 140 in FIGURE 6 is to provide an output at terminal 336 connected to the on-side inputs of each of the digital triggers during the last portion of a character recognition cycle as determined by the input to the AND circuit 334 or when the document sensing means senses the leading edge of a document. The output at terminal 336 sets on all of the digital triggers. When the digital triggers are on, the integration circuits are held in a reset condition and thus there can be no partial progress of any integration cycle during the major portion of the interval betwen adjacent characters. At the end of the cycle of operation of the timing circuit, the three inputs to the AND circuit 334 will drop off and thus the output at terminal 336 will drop off.

At this time, due to the completion of a cycle of operation of the forty step ring shown in FIGURE 7, the read trigger 171 will be set off producing an input to AND circuit 332 from terminal 217 in FIGURE 6. The digital triggers, having been on for more than half of a character increment will be providing inputs to the AND circuit 332 on line 331 and from the delay circuit 333. The output produced by the AND circuit 332 at this time will turn off all of the digital trigger. All of the buffer triggers are now off, the timing circuit of FIGURE 7 is at rest and the system is awaiting the turning on of a digital trigger indicating the arrival of a next character to be recognized.

Referring again to FIGURE 5, the trigger matrix, as has been previously described, comprises vertical columns of triggers indicated as columns A–G, employing the reverse sequence of character increments from the sequence of character increments shown in FIGURE 2, but resulting in the character increments in the matrix being read from left to right as equivalents of actual increments of the character 12 shown in FIGURE 1 as being read from left to right.

From FIGURE 7, and the description recited above in connection therewith, it will be evident that control pulses are applied successively to terminals 201–207, of FIGURE 5, at time intervals as indicated by the positions of the timing pulses on line XIII of FIGURE 2*a*. These timing pulses are delivered to the set inputs of their respective columns of matrix triggers and are gated to each matrix trigger under control of its respective buffer or digital trigger. After the arrival of the timing pulse at terminal 207, the various triggers of the trigger matrix 36, will have been set to provide a representation of the character scanned during the preceding scanning interval.

As previously noted, in view of the fact that channel reduction is employed because the read heads 16 provide more than the number of channels necessary to scan the height of a character, it is possible that the character representation appearing in the matrix of FIGURE 5, will not be centered vertically therein. The representation may, for example, be so positioned that the lower portion of the character appears in the upper portion of the matrix and the upper portion of the character appears in the lower portion of the matrix. In order to provide a vertical centering of the character in the matrix so that recognition circuits may be operative, it is necessary that the character representation in the matrix be rolled vertically through the matrix for 360°, i.e., successively stepped vertically through the ten trigger rows. During this rolling, the recognition circuits scan the matrix trigger settings, seeking to recognize a character from the trigger settings occurring at each of the ten roll positions.

This roll is accomplished by the provision of ten successive pulses at terminal 150 in FIGURE 5. The means for generating these pulses will be described in connection with FIGURE 8. As previously described, when the pulses are received at terminal 150, they provide set pulses on both on-side and off-side inputs to each of the triggers in the matrix. However, these inputs to each trigger are gated by the on-side and off-side outputs respectively of the next lower trigger in its column. Thus, for example, trigger TMA1 has its on-side set input, which is connected to terminal 150, gated by the on-side output of trigger TMA2, accordingly, as each successive roll pulse is received, the trigger TMA1 will be set on by the set pulse only if the trigger TMA2 was on before the pulse arrived. Similarly, the trigger TMA1 will not be set on if the trigger TMA2 was not on before the pulse arrived. Accordingly, the representation of a character in the trigger matrix will be rolled vertically in ten steps through the ten rows of triggers by the ten successive matrix roll pulses received at terminal 150.

The circuitry for providing the matrix roll pulses will now be described.

Figure 2B:
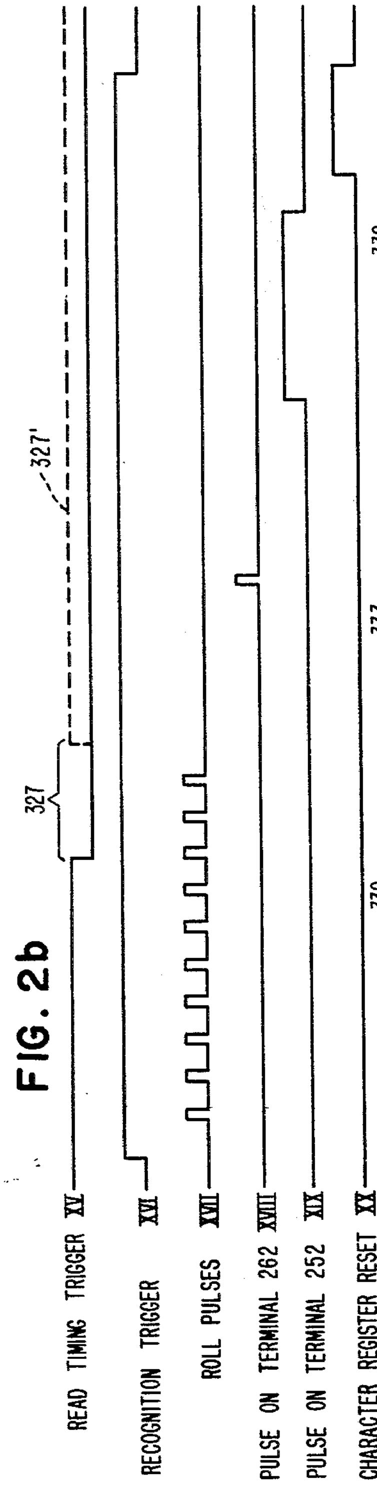

In FIGURE 8, there is shown a recognition trigger 221, having its on-side set input connected to terminal 215 of FIGURE 7 and having pulses received therefrom gated by pulses received from terminal 214 of FIGURE 7. Terminal 215 is connected to the off-side output of trigger 175. Terminal 214 is connected to the AND circuit 197. Thus, trigger 221 is set on after the end of the A character increment when the trigger 175 is set off and before the triggers 175, 176 and 177 are set on for the last time during a ring cycle. In FIGURE 2*b*, lines XV and XVI show the relative times of turning off of read timing trigger 171 and turning on of trigger 221.

The on-side output of trigger 221 is taken on line 222 and delivered to a two input AND circuit 223. The output of the AND circuit is employed as a gating pulse to the on-side input of a trigger 224.

The trigger 224 acting in conjunction with triggers 225 and 226 forms a five step ring. The on-side and off-side set inputs of these triggers are connected to the output of a free-running multivibrator 232, taken on line 233, which starts with a negative going pulse.

The on-side output of trigger 224 taken on line 227, gates the on-side input of trigger 225. The on-side output of trigger 225 taken on line 228, gates the on-side input of trigger 226. The on-side output of trigger 226 taken on line 229, gates the off-side input of 224. The off-side output of trigger 24 taken on line 230, gates the off-side inputs of trigger 225 and 226. The off-side output of trigger 226 provides the second input for the AND circuit 223, the output of which forms the input gate pulse for trigger 224.

Initially, the three triggers are all off and the first positive going pulse from the multivibrator 232 on line 233, after read trigger 221 has been turned on, turns on trigger 224. The second pulse turns on trigger 225, the third pulse turns on trigger 226, the fourth pulse turns off trigger 224, and the fifth pulse turns off triggers 225 and 226. Thus, the triggers 224, 225, and 226 form a five step ring, stepped in accordance with the timing pulses produced by the multivibrator 232. In accordance with the other timing examples given herein, the multivibrator 232 runs at approximately 78 kc., providing approximately 13 microsecond periods between pulses.

As previously noted, the on-side output of trigger 221 taken on line 222, forms an input to the AND circuit 223. Accordingly, the ring will continue to run only as long as the trigger 221 is on.

The on-side output of the trigger 224, taken on line 227, is delivered to the set lines of the on-side and off-side inputs of each of three triggers, 235, 236 and 237. These triggers form a six step ring as will be described, which is advanced one step each time the five step ring completes its five steps. Accordingly, the five step ring and six step ring, acting together, provide thirty recognition pulses.

The triggers 235, 236 and 237 are normally off. The off-side output of trigger 237 gates the on-side input of trigger 235, accordingly, the first pulse received from the on-side output of trigger 224 will turn on trigger 235. The on-side output of trigger 235 taken on line 239, gates the on-side input of trigger 236. The on-side output of trigger 236 taken on line 240, gates the on-side input of trigger 237. The on-side output of trigger 237 taken on line 241, gates the off-side input of trigger 235. The off-side output of trigger 235, taken on line 242, gates the off-side input of trigger 236. The off-side output of trigger 236 taken on line 243 gates the off-side input of trigger 237. Accordingly, the three triggers control each other to provide a six step ring.

Trigger 235 is on and trigger 237 is simultaneously off for two successive cycles of the five step ring, thus, the multivibrator 232 will have pulsed ten pulses during this time interval. These ten pulses are shown on line XVII of FIGURE 2*b* and are used as the roll pulses delivered to terminal 150 of FIGURE 5 for rotating the matrix of FIGURE 5, as has been described. These pulses are delivered to terminal 150 in FIGURE 8 in the following manner. The on-side output of trigger 235 taken on line 239 and the off-side output of trigger 237 taken on line 238, are delivered to a two input AND circuit 245. The output from the AND circuit taken on line 246 is employed to gate the input to a single shot 260. The output of multivibrator 232, taken on line 256, is delivered to the set input of a single shot 257. This input is gated by the on-side output of trigger 221 taken on line 222. Accordingly, the single shot 257 will provide a train of pulses in response to the output of the multivibrator 232 during that time interval when the trigger 221 is on. This train of pulses from the single shot 257 is delivered through line 258 to the set line of the single shot 260 during the gating time previously noted. Accordingly, the single shot 260 will pass ten pulses to the terminal 150 under the control of triggers 221, 235, and 237 providing the ten matrix roll pulses, previously described.

The output of the AND circuit 245 taken on the line 246, is also delivered to a terminal 247.

The on-side output of trigger 225 taken on the line 228, is delivered to the terminal 248.

The off-side output of trigger 236 taken on line 243 and the onside output of trigger 237 taken on line 241 are delivered to a two input AND circuit 249. The output of the AND circuit is delivered to terminal 252.

The off-side output of trigger 235 taken on line 242, is delivered to a terminal 262.

Line 242 is also connected to one input of a two input AND circuit 243. The other input to the AND circuit 243 is connected to the off-side output of trigger 237 through line 238. The output of the AND circuit 243 taken on line 244 is employed as a gate pulse in the off-side input of trigger 221. The off-side input set for trigger 221 is taken from the off-side output of trigger 226 on line 231. Thus, after the two rings have run through their thirty steps, the trigger 221 will be turned off. The on time of recognition trigger 221 is indicated on line XVI in FIGURE 2*b*.

The on-side output of trigger 225 taken on line 228, and the output of AND circuit 243 taken on line 244, are delivered to a two input AND circuit 253, the output of which is delivered to a terminal 254.

The output of the multivibrator 232 taken on line 233, is delivered to terminal 255.

The output of multivibrator 232 taken on line 256 is gated through the single shot 257, as previously described, and the output of the single shot taken on line 258, is delivered to terminal 259.

The terminals 161 connected to the off-side inputs of each of the triggers 221, 224, 225, 226, 235, 236, 237, are connected to terminal 161 in FIGURE 7.

While the trigger matrix shown in FIGURE 5 is being rotated through the ten positions in response to the ten roll pulses produced at terminal 150 in FIGURE 8, recognition circuits are constantly sampling the settings of the triggers in the trigger matrix of FIGURE 5.

A typical recognition circuit is shown in FIGURE 10, and a typical recognition "statement" is shown in FIGURE 11. The "statement" and circuit are for the character digit "2" shown at 12 in FIGURE 1.

In FIGURE 11, there is indicated at 270 a matrix of blocks in which the blocks are representative of the individual triggers of the trigger matrix shown in FIGURE 5. The blocks are arranged in ten horizontal rows indicated as 1–10 representing the ten channels and in seven vertical columns indicated as A–G representing the seven character increments. Those blocks bearing the indication W indicate that the trigger corresponding to that block in the trigger matrix must have been set off in order to indicate a character "2," i.e., the corresponding scanning head for that channel at the time indicated by the column in the matrix must have observed a white or unprinted area on the character bearing document being scanned. Those blocks marked with the indication B indicate that the trigger corresponding to that block in the trigger matrix must have been set on in order to indicate a character "2," i.e., the corresponding scanning head for that channel at the time indicated by the column in the matrix must have observed a black or printed area on the character bearing document being scanned. Those blocks bearing neither the indication W nor the indication B, represent triggers which are not considered in the recognition of the character "2."

It will be observed that some of the blocks are shown as connected together by lines indicated by the numerals 271–278. The lines 271-278, each of which joins together a pair of blocks in FIGURE 11, indicate that only one of the conditions represented at the two ends of the line need be present in order to provide recognition.

In FIGURE 10, there is indicated generally at 38, a typical recognition circuit for one digit. The circuit shown is for the digit 2 and is an embodiment of the recognition statement indicated diagrammatically in FIGURE 11.

In FIGURE 10, there is shown two input OR circuits, 271–278. These OR circuits embody the requirement indicated by the lines 271–278 shown in FIGURE 11. It will be observed that the inputs to each of these OR circuits are identified as the outputs of triggers of the trigger matrix shown in FIGURE 5, corresponding to the blocks at the end of the corresponding line in FIGURE 11. The black or white conditions as required by the statement of FIGURE 11 is indicated by the notation on each of the input terminals. Thus, for example, OR circuit 278 is marked as having one input $\overline{F4}$ and as having its other input G4. It will be evident that this is conventional notation as indicated at the on-side output of TMG4 and the off-side output or "not" output of TMF4. The other OR circuit inputs are similarly marked. In view of the fact that a trigger is turned on to indicate a black input and not turned on to indicate a white input, it will be apparent that the G4 is indicative of a black input whereas $\overline{F4}$ is indicative of a white input.

Accordingly, the OR circuits 271–278 represent circuitry embodying the requirements set forth by the lines 271–278 in the statement of FIGURE 11. The OR circuit outputs are delivered through AND circuitry, represented as a single block, 279, to an output line 280. The AND circuit 279 represents the requirement that all of the conditions required by the statement of FIGURE 11 will simultaneously present with the exception, of course, of the alternative requirements indicated by the lines 271-278 and accommodated by the OR circuits 271–278. Thus, an output on line 280 indicates that trigger matrix settings observed satisfied the statement requirements for the recognition of the numeric character "2."

The ouput on line 280 provides a gate pulse for a character register trigger 281. This trigger is for the character "2" and will be set to indicate that this character has been recognized. The trigger 281 in FIGURE 10, bears the notation TCR2. It will be evident that the character register indicated at 40 in FIGURE 1 will have a trigger for each character to be recognized. It will also be evident that for each character to be recognized, there will be selected a statement which will serve to identify that character and to distinguish it from all other characters to be recognized. This type of statement employed in character recognition is known in the art and additional statements need not be described herein in detail. It will be evident to those skilled in the art that statements can be written for many different characters which will serve to identify the characters and to distinguish them from other characters.

The timing circuit of FIGURE 9, which will be hereinafter described, provides, during the roll pulse time indicated on line XVI in FIGURE 2*b*, a series of set pulses which are delivered to terminal 282 in FIGURE 10. Any of these pulses will set the trigger 281 if the trigger is gated by an output of the AND circuit appearing on line 280. It will be evident that the set pulse at terminal 282 will be similarly delivered to the on-side input of each of the triggers in the character register 40. If none of the recognition circuits provide outputs to their associated character register triggers, then none of the triggers will be set on. If only one of the recognition circuits provides an output then that one trigger will be set on. If more than one of the recognition circuits provide outputs then more than one character register trigger will be set on. But, in each instance, the setting on, if any, will occur at the time a set pulse appears at terminal 282.

The off-side input of the trigger 281 and all of the other character register triggers is connected to terminal 254. This terminal, as described in conjunction with FIGURE 8, carries a pulse for the time interval that trigger 125 is on and triggers 235 and 237 are off. This time interval occurs only during the last of the six on time intervals of trigger 225 during a period of operation of the two rings described in connection with FIGURE 8 and is shown on line XIX in FIGURE 2*b*. This pulse serves to turn off all of the character register triggers which were gated by their associated recognition circuits and set on by a set pulse appearing at terminal 282. The character register triggers are thus prepared for the next successive character cycle. The off-side input of each character register trigger is also connected to terminal 161 in FIGURE 7.

As has been previously noted, in connection with the description of FIGURE 1, it is desirable upon each operation of the system, to determine that a character has been actually recognized and to determine that only one character has been recognized. This is accomplished by the checking circuit indicated at 42 in FIGURE 1, acting in conjunction with the timing circuit 32.

The checking circuit is indicated generally at 42 in FIGURE 12, and serves to provide an output at terminal 285 if one or more characters were recognized and serves to provide an output at terminal 286 if more than one character or less than one character was recognized.

The inputs to the checking circuit of FIGURE 12 are indicated generally at 283 and are taken from the onside outputs of the character register triggers, one of which is shown at 281 in FIGURE 10. The inputs are indicated at T1–T0, representative of ten numeric character triggers TCR1–TCR0, and TSS1–TSS4, indicative of four special symbol character triggers, TCRSS1–TCRSS4, thus, the checking circuit shown provides checking for the recognition of only one character of fourteen characters composed of ten numeric characters and four special symbol characters.

In FIGURE 12, an OR circuit 287 has its four input circuits connected to T1–T4. OR circuit 288 has its three inputs connected to T5–T7. OR circuit 289 has its three inputs connected to T8–T0. OR circuit 290 has its four inputs connected to TSS1–TSS4. The outputs of OR circuits 287 and 288 are connected to an OR circuit 291. The outputs of OR circuits 288 and 289 are connected to an OR circuit 292. The outputs of OR circuits 289 and 290 are connected to an OR circuit 293. The outputs of OR circuits 287 and 290 are connected to an OR circuit 294. The outputs of OR circuits 291 and 293 are the two inputs of an AND circuit 295. The outputs of OR circuits 292 and 294 are the two inputs of an AND circuit 296. The outputs of the two AND circuits 295 and 296 are delivered through an OR circuit 297 to terminal 286.

The outputs of character recognition triggers T1, T5, T8 and TSS1 are connected to an OR circuit 298. Triggers T2, T6, and TSS2 are connected to an OR circuit 299, T3, T9, TSS3, are connected to an OR circuit 300, and T4, T7, T0 and TSS4 are connected to an OR circuit 301. The outputs of OR circuits 298 and 299 are connected to an OR circuit 302. The outputs of OR circuits 299 and 300 are connected to an OR circuit 303. The outputs of OR circuits 300 and 301 are connected to an OR circuit 304, and the outputs of OR circuits 298 and 301 are connected to an OR circuit 305. The outputs of OR circuits 302 and 304 are the two inputs of an AND circuit 307. The outputs of OR circuits 303 and 305 are the two inputs to an AND circuit 308. The outputs of the two AND circuits 307 and 308 are connected through the OR circuit 297 to terminal 286.

The outputs of each of the OR circuits 298–301 are also connected through an OR circuit 306 to the terminal 285, and through an inverter 309 and the OR circuit 297 to the terminal 286.

The terminals 285 and 286 of FIGURE 12 are connected to the input terminals 285 and 286, respectively, of FIGURE 9. The circuitry shown in FIGURE 9 produces the set pulse heretofore described as appearing at terminal 282 of FIGURE 10 and also produces an error signal for delivery to suitable indicating or control apparatus. The circuitry of FIGURE 9 will now be described.

In FIGURE 9, an input terminal 150, there are received the ten roll pulses produced at terminal 150 in FIGURE 8. These pulses were employed in the trigger matrix of FIGURE 5 to rotate the trigger settings as has been previously described. In FIGURE 9, the ten roll pulses are delivered to both the on-side and off-side set lines of each of five triggers, 291–295. These inputs are gated as will be described. Assuming that all of the triggers are initially in an off condition, the off-side output of trigger 295 taken on line 296 gates the on-side of trigger 291, thus, the first roll pulse sets on trigger 291. The on-side output of trigger 291 taken on line 297 gates the on-side input of trigger 292. Thus, the second pulse sets on trigger 292. The on-side output of trigger 292 taken on line 298 gates the on-side input of trigger 293. Thus, the third roll pulse sets on trigger 293. The on-side output of trigger 293 taken on line 299 gates the on-side input of trigger 294. Thus, the fourth roll pulse sets on trigger 294. The on-side output of trigger 294 taken on line 300 gates the on-side input of trigger 295, thus, the fifth roll pulse sets on trigger 295.

Accordingly, if all five, of the triggers were initially off, the first five pulses will successively set on the triggers starting with the trigger 291 and ending with all five of the triggers in an on condition.

The on-side output of trigger 295 taken on line 301 gates the off-side input of trigger 291 thus the sixth pulse sets off trigger 291. The off-side output of trigger 291 taken on line 302 gates the off-side input of trigger 292, thus, the seventh pulse sets off trigger 292. The off-side output of trigger 292 taken on line 303 gates the off-side of trigger 293. Thus, the eighth pulse sets off trigger 293. The off-side output of trigger 293 taken on line 304 gates the off-side input of trigger 294, thus, the ninth pulse sets off trigger 294. The off-side output of trigger 294 taken on line 305 gates the off-side of trigger 295 thus, the tenth pulse sets off trigger 295.

Accordingly, the second five pulses will successively set off triggers 291–295, and thus at the end of ten pulses, all five triggers will again be in an off condition.

The roll pulses received at terminal 150 are also delivered to the set input of a single shot 317. As will be hereinafter described, this is a gated input, however, when any of the roll pulses are gated into the single shot 317, output pulses produced are delivered to terminal 282. It is these pulses, which, as described in connection with FIGURE 10, serve to set on any character register trigger which is gated by its associated recognition circuit. These set pulses occur at substantially the same instant as their accompanying roll pulses, i.e., positive going leading edges of set and roll pulses are substantially coincident, accordingly, the matrix is sampled for possible character recognition, and, immediately thereafter, the settings of the matrix triggers are rotated upwardly one row.

The input to single shot 317 is provided with a gate formed by the output of an AND circuit 326. The AND circuit 326 has two inputs, one of which is provided by the output of an OR circuit 316 which has two inputs. One of the inputs to the OR circuit 316 is provided by an AND circuit 312, and the other is provided by an AND circuit 314. Both of these AND circuits have seven input circuits. AND circuit 312 has its seven inputs connected to the off-side output of the top, or number one channel row of matrix triggers of FIGURE 5. These input connections are indicated generally at 313 in FIGURE 9, and are identified by notations $TM\overline{A1}$–$TM\overline{G1}$. Thus, the AND circuit 312 provides an output when the top row of matrix triggers, i.e., the triggers of channel one for the seven character time increments, are all indicating white.

Similarly, AND circuit 314 has seven inputs indicated generally at 315 and noted as connected to $TM\overline{A10}$–$TM\overline{G10}$ indicating the off-side outputs of the bottom row of triggers of FIGURE 5.

Accordingly, when either all of the one or top row of channel triggers or when all of the ten or bottom row of channel triggers of the trigger matrix are not set on, indicating all white areas scanned in that row and when there is an output from OR circuit 306, a gate pulse is provided for the single shot 317. It will be evident that during rotation of the matrix trigger settings by the ten roll pulses, the occurance of all white trigger settings at either the top or the bottom row of the trigger matrix will indicate that a character representation is centered vertically in the matrix. By delivering the set pulse to the character register triggers, such as the trigger 281 of FIGURE 10, at this time, the reliability of character recognition is improved by preventing possible improper recognition during time intervals when the register matrix is displaying a character representation in uncentered arrangement.

The other of the two inputs to AND circuit 326 providing gates for single shot 317 is provided by the output of an OR circuit 306. One input to the OR circuit 306 is connected to the on-side output of trigger 291 taken on line 297. The other input to the OR circuit 306 is provided by the on-side output of a trigger 307 taken on line 308.

Accordingly, if either the trigger 291 is on or trigger 307 is on, and if either the top or bottom row of matrix triggers are all indicating white, the next roll pulse will produce an output pulse on terminal 282 from the single shot 317 causing a sampling of the recognition circuits by the character register triggers indicated generally at 40 in FIGURE 1.

The trigger 307 is turned on by the output pulse produced on terminal 161 by the single shot 218 in FIGURE 7 in response to operation of the document sensing means 15 as the leading edge of a document passes thereunder. Thus, when the first character on the document is being sensed and the roll pulses are being produced, the trigger 307 is on.

The trigger 307 is turned off by a pulse received at terminal 262 produced by turning off ring trigger 235 of FIGURE 8. This pulse occurs after the end of the ten roll pulses and at the time indicated by the pulse on line XVIII in FIGURE 2*a*.

The trigger 307 may be set on during the scanning of a document between successive characters thereon by a set pulse received at terminal 248 produced by the on-side output of ring trigger 225 of FIGURE 8 which comes on six times while the recognition trigger 221 is on. This pulse, must however, be gated by an output from an OR circuit 309 which has two inputs, one from a two input AND circuit 310 and the other from a two input AND circuit 311.

Both of the AND circuits 310 and 311 have one input received from terminal 252 produced when trigger 237 of FIGURE 8 is on and trigger 236 of FIGURE 8 is off. This pulse appearing on terminal 252 is shown on line XIX of FIGURE 2*b*. Thus, the set pulses appearing at terminal 248 can be gated to trigger 307 only during the time of the pulse of terminal 252 shown on line XIX which is after the time of the ten roll pulses and after the time of the pulse at terminal 262 turning the trigger 307 off.

As previously described, the set pulses produced at terminal 282 for setting on the character register triggers 40, one of which is shown at 281 in FIGURE 10, are produced during the time of occurance of roll pulses at terminal 150. If, during this roll time, more than one character register trigger or less than one character register trigger has been set, a signal will exist at terminal 286 of the checking circuit of FIGURE 12 and on one of the inputs of the AND circuit of 310 of FIGURE 9 after the end of the roll time.

During the pulse time at terminal 252, as indicated on line XIX of FIGURE 2*b*, there is a signal at terminal 252. Accordingly, if there was a digit error signal on line 286, the arrival of a pulse at terminal 252 will produce an output from the AND circuit 310, and the trigger 307 will be set on during the pulse time shown on line XIX. If there was a proper recognition of only one character, the trigger 307 will remain off.

In FIGURE 2*b*, line XV, indicates the time of turning off of the read timing trigger 171 and at the end of a time thereafter, indicated by the bracket 327, a dotted line 327' indicates the turning on of the read timing trigger 171 during reading of a next successive character.

As will be evident from the bracket 327, the read timing trigger 171 is off for a relatively short interval between adjacent characters.

The AND circuit 311 has one of its inputs from terminal 252 and the other of its inputs from terminal 217 which is taken from the off-side output of trigger 171 of FIGURE 7. Thus, the signal at terminal 217 exists during the time indicated by the bracket 327 in line XV of FIGURE 2*b*. The input on terminal 252 exists for the time indicated by the pulse on line XIX of FIGURE 2*b*. Thus, if a second character immediately follows the first character, there will be no output from the AND circuit 311 and the trigger 307 will not be set on.

Accordingly, the trigger 307 is set on only by the leading edge of a document or by the production of a digit error signal from the checking circuit of FIGURE 12, or by the trigger 171 being off at the time of the pulse at terminal 252. This last condition would exist, for example, when the space between characters was equal to several times the normal space between characters. Thus, normally during the reading of a succession of characters, the trigger 307 will be on during the reading of the first character, will be turned off following the recognition of the first character by the arrival of a pulse at terminal 262 and will remain off during the reading of the successive characters. Thus, for each character following a first character of a sequence of characters, the single shot 317 will be gated only by the white indicating circuits 312 or 313 and by the coming on of trigger 291.

Upon the recognition of a character, a trigger 318 is acted on by the output of the checking circuit of FIGURE 12 taken on terminal 285 which serves as a gate to pass pulses received on terminal 259 from the single shot 257 of FIGURE 8 which is set by the free running multivibrator 232 and gated by the recognition trigger 221. The on-side output of trigger 318 taken on line 319 serves to gate the on-side input of a trigger 320 which receives set pulses from terminal 255 from the output line 233 of the free running multivibrator 232 of FIGURE 8. Both the trigger 318 and trigger 320 are turned off by the pulse on terminal 247 occurring when trigger 237 of the FIGURE 8 is off and trigger 235 is on, i.e., during the period of the roll pulses on terminal 150.

When a character recognition pulse exists at terminal 285, providing a gate pulse for trigger 218 and before the trigger 218 has gated a pulse from terminal 255 to turn on trigger 320, a two input AND circuit 322 receives simultaneously one input from terminal 285 and the other input from the off-side output of trigger 320. The output of AND circuit 322 taken on line 323 is delivered to the on-side inputs of each of the triggers 291–295 turning on each of these triggers. The output from the AND circuit 322 is also delivered through an inverter 324 and serves as a gate for the off-side input of trigger 291. This gate serves to counteract any gate effect the switching on of trigger 295 by the output of the AND circuit 322 may have on trigger 291.

It will be evident from the foregoing that upon the production of an output on terminal 285 of the checking circuit of FIGURE 12, indicating a character recognition, the ten step ring of FIGURE 9 will be set with all of its triggers on. Thereafter the remaining roll pulses received at terminal 150 will cause the ring to step through its sequence, starting from this all trigger on condition.

The turning on of all of the triggers 291–295 by the output of AND circuit 322, is accomplished during the first roll pulse following the roll pulse during which character recognition was affected. Thus, this first following roll pulse does not advance the trigger ring. The second roll pulse following the roll pulse during which character recognition was affected is therefore the first roll pulse to advance the ten step arrangement to its next successive position.

The result of the operation of this circuitry is to set the ten step ring of FIGURE 9 with respect to the group of ten roll pulses in a position that the five on conditions of trigger 291 will occur for the five successive pulses having their center pulse occuring at the time the character was recognized in the previous ring cycle.

Accordingly, after a first character of a succession of characters has been recognized, the matrix triggers sampled by the on-side output of trigger 291 only during those five roll pulses which are centered on the position in which the previous recognition was made. This arrangement serves to eliminate half of the ten interrogations which occurred when the first character was being read and thus serves to reduce possibility of erroneous recognitions.

To review briefly, the circuitry of FIGURE 9 generates pulses at terminal 282 which are delivered to the set inputs of the character register triggers. Ten set pulses are generated for recognition of the first character on a document for recognition of the first characters following a space equal to several times the normal space between characters, and for recognition of the first character following a character producing an error signal at terminal 286. Five set pulses are generated for recognition of a character following recognition of a previous character of a series and these pulses are centered on the position at which the previous character was recognized in the register matrix.

As previously noted, the output of AND circuit 310 denotes an erroneous recognition, i.e., either more than one recognition or less than one recognition. The output of this AND circuit is delivered to terminal 325 for utilization by external apparatus desirably responsive to the fact that the recognition apparatus has recognized an erroneous reading.

In FIGURE 13, there is shown circuitry which may be employed in place of the circuitry which has been described in connection with FIGURE 9. The arrangement shown in FIGURE 13 makes possible the use of a special symbol at the beginning of a row of characters to be recognized to restrict the number of roll positions during which recognition is attempted on each of the characters following the special symbol. In other words, an easily readable symbol affording a minimum possibility of erroneous reading may be employed to restrict the degree of vertical search through the matrix during the recognition operations performed in response to a succeeding row of characters.

The terminal 282 in FIGURE 10, to which all the character triggers 281 are connected, is, when the arrangement shown in FIGURE 13 is employed, provided with pulses from terminal 282 in FIGURE 13 as will be described. In FIGURE 13, there is also provided a terminal 282′ which is delivered to the recognition trigger for a special symbol adapted to always precede the first character of a row of characters to be recognized. Pulses at terminal 282′ are provided by means of a single shot 349 set by the ten roll pulses, heretofore described and delivered to terminal 150, when these pulses are gated by the output OR circuit 316 connected to the outputs of two AND circuits 312 and 314 respectively connected to the off-side outputs of the top and bottom rows of triggers respectively of the matrix register 36 shown in FIGURE 5. The OR circuit 316 and the AND circuits 312 and 314 are identical to those described in connection with FIGURE 9 and serve to indicate when either the top or bottom row of matrix triggers are indicating "white." Thus, recognition pulses are produced at terminal 282′ for delivery to the special symbol trigger in response to any of the roll pulses during which the register matrix is showing either a "white" top or "white" bottom row.

In FIGURE 13, there is indicated generally at 350, a ring formed by four triggers 352, 353, 354, and 355, which will be referred to as the vertical recognition ring. There is also shown a second ring indicated generally at 351 and formed of triggers 356, 357, 358 and 359 which will be referred to as the vertical search ring. As will be described, the triggers are arranged to provide a type of shift register wherein at prescribed times, the state of advance of the vertical recognition ring 350 is shifted to the vertical search ring 351.

The on-side and off-side inputs of triggers 352, 353, 354, and the off-side input of trigger 355 are connected to terminal 150 and thus receive the ten roll pulses previously described. These pulses are gated to the triggers as follows: the off-side output of trigger 352 taken on line 365 gates the off-side input of trigger 353, the off-side output of trigger 353 taken on line 366 gates the on-side input of trigger 352 and the off-side input of trigger 354, the on-side ouput of trigger 352 taken on line 362 gates the on-side input of trigger 353, the on-side output of trigger 353 taken on line 363 gates the on-side input of trigger 354, the on-side output of trigger 354 taken on line 364 gates the off-side input of trigger 352. The off-side output of trigger 353 taken on line 366 and the on-side output of trigger 354 taken on line 364 provide the two inputs for a two input AND circuit 360. The output of the AND circuit 360 taken on line 377 gates both the off-side and the on-side input of trigger 355, however, its on-side input is also gated from its off-side output taken on line 374, and its off-side input is also gated from its on-side output taken on line 375. Thus upon the receipt of a pulse from terminal 150 during the time of an output from the AND circuit 360 the trigger 355 will reverse its setting.

The off-side input of trigger 352 and the on-side inputs of triggers 353, 354, and 355 are connected to terminal 205 which receives a pulse when trigger 184 in FIGURE 7 is set off. This pulse occurs at the time indicated by the column C transfer pulse in line XII of FIGURE 2*a*.

A pulse is received at terminal 285 from the circuitry shown in FIGURE 12 upon the recognition of a character and this pulse serves as a gate for the off-side input of trigger 353.

The triggers 356, 357 and 358 have their on-side and off-side inputs connected to the roll pulse terminal 150. Trigger 359 has its off-side input connected to the roll pulse terminal 150. These pulses are gated to the respective triggers as follows: the off-side output of trigger 356 taken on line 371 gates the off-side input of trigger 357, the off-side output of trigger 357 taken on line 372 gates the on-side input of trigger 356 and the off-side input of trigger 358, the on-side output of trigger 356 taken on line 368 gates the on-side input of trigger 357, the on-side output of trigger 357 taken on line 369 gates the on-side input of trigger 358, the on-side output of trigger 358 taken on line 370 gates the off-side input of trigger 356. The off-side output of trigger 357 taken on line 372 and the on-side output of trigger 358 taken on line 370 provide inputs for the two input AND circuit 361, the output of which, taken on line 373, serves to gate both the off-side and the on-side input of trigger 359, however, its on-side input is also gated from the off-side output taken on line 377, and its off-side input is also gated from its on-side output taken on line 376. Thus upon the receipt of a pulse from terminal 150 during the time of an output from the AND circuit 361, the trigger 359 will reverse its setting.

The previously described pulse delivered to terminal 205 is also delivered to the on-side and off-side inputs of each of the triggers 356, 357, 358, and 359. These pulses are, however, gated by outputs from the vertical recognition ring triggers as follows: the off-side input of trigger 356 is gated by the off-side output of trigger 352 taken on line 365, the on-side input to trigger 356 is gated by the on-side output of trigger 352 taken on line 362, the off-side input of trigger 257 is gated from the off-side output of trigger 353 taken on line 366, the on-side input of trigger 357 is gated from the on-side output of trigger 353 taken on line 363, the off-side input to trigger 358 is gated by the off-side output from trigger 354 taken on line 367, the on-side input to trigger 358 is gated from the on-side output of trigger 354 taken on line 364, the off-side input to trigger 359 is gated by the off-side output of trigger 355 taken on line 374, the on-side input to trigger 359 is gated by the on-side output of trigger 355 taken on line 375.

From the foregoing, it will be evident that when the pulse is delivered to terminal 205, there will occur a transfer of the settings of triggers of the vertical recognition ring 350 to the triggers of the vertical search ring 351. The pulse at terminal 205 will also serve to reset the triggers of the vertical recognition ring 350 with the trigger 352 off and triggers 353, 354, and 355 on.

With the triggers of ring 350 in the reset condition, the arrival of pulses at terminal 150 will have no effect on any of the triggers until after the recognition of a character and the receipt of the resulting signal at terminal 285. This signal will serve to gate the next roll pulse to the off-side input of trigger 353.

If it is assumed that the recognition of the first character, i.e., the special symbol, occurred upon the first roll pulse, the remaining nine roll pulses will, when delivered to the vertical recognition ring, cause the triggers to be set on and off in the following sequence: the first roll pulse following a character recognition will set trigger 353 off, the second roll pulse will set trigger 352 on and triggers 354 and 355 off, the third roll pulse will set trigger 353 on, the fourth roll pulse will set trigger 354 on, the fifth roll pulse will set trigger 352 off, the sixth roll pulse will set trigger 353 off, the seventh roll pulse will set triggers 352 and 355 on and set trigger 354 off, the eighth roll pulse will set trigger 353 on, and the ninth roll pulse will set trigger 354 on. It will be evident, however, that this sequence will be limited by the number of roll pulses remaining after a character recognition, and thus, if for example, a recognition is accomplished on the ninth roll pulse, the ring 350 will advance only to the first step and this condition of the ring 350 will be shifted to the ring 351 upon the receipt of the next pulse at terminal 205.

It will be evident from the foregoing description, that the ring 351 will pass through the same sequence of ring trigger conditions in response to roll pulses as the ring 350. The rings will generally not, however, be in the same conditions at the same time due to the fact that at the time of a pulse on terminal 205, the ring 351 has transferred thereto the settings of the ring 350 whereas the ring 350 is restored to a reset condition. Thus, the ring 350 always commences its operation from the same state whereas the ring 351 commences its operation from a state equivalent to the final state of ring 350 in its previous operation.

Both of the rings operate in such a manner that the first three triggers of the rings are each on twice for intervals of three pulse duration spaced by off intervals of two pulse duration during each ten roll pulses. The fourth trigger in each ring, i.e., triggers 355 and 359 are each on only once during a ten roll pulse sequence and are on the latter five pulse intervals thereof. The arrangement described, wherein the vertical recognition ring 350 is advanced only by those roll pulses following a roll pulse on which a recognition occurred and wherein the search ring 351 goes through ten roll positions with each ten roll pulses starting from the position transferred thereto from the ring 350, causes trigger 359 to be on during five roll pulses centered on the roll pulse during which the previous recognition was made. Accordingly, the single shot 348 is gated to provide an output at terminal 282 connected to each of the character triggers other than the special symbol trigger in response to only these five roll pulses, therefore, the number of attempted recognitions during the matrix roll operations is reduced by one-half and thus the possibility of erroneous or conflicting recognitions is reduced by one-half.

While the foregoing description of FIGURE 13 has been made with regard to the existence of only one special symbol, it will be evident that various special symbols may be employed at successive intervals throughout a line of characters to be recognized and if these special symbols are each designed for easy recognition and the respective special symbol triggers corresponding to trigger 281 shown in FIGURE 10, are each provided with set pulses from terminal 282′, the plurality of special symbols may be employed in substantially the same manner as the single special symbol described above to provide vertical search control for each of a succession of lines of characters.

Summarizing the disclosed invention briefly, it is particularly noted that the vertical roll provisions and the utilization of means such as shown in FIGURES 9 and 13 to restrict the number of recognition samplings, become extremely valuable when a number of scanning channels is employed providing for scanning of a vertical height greater than the vertical height of a character to be recognized resulting in the matrix representation of the character being variously positioned within the matrix depending upon the particular alignment of the character scanned with regard to the various channels of the multi-channel scanning means.

A further particularly valuable aspect of this invention is the digitalization means provided in the form of the integration scheme disclosed. Digitalization of this type provides for the recognition of the presence or absence of a character forming area at each of a plurality of incremental time intervals during the scanning of a character and provides this digitalization in each of the multichannel scanning means. Thus, a new and substantially independent recognition of "black" and "white" is made in each channel at each character increment.

This type of digitalization is made particularly effective by the initiation of operation of the timing means for establishing the incremental times in response to the sensing of a character. It is only by this expedient that the first incremental time can be made to begin substantially coincident with the leading edge of a character. Thus, there is built into the operation a type of "automatic" timing synchronization and if the number of increments and their time durations are selected in accordance with the widths of lines and the spacings of lines forming characters, as determined by a particular type font, the difficulties which would otherwise be presented by scanning a "black" surface for half a character increment and scanning a "white" surface for the other half of the character increment are avoided.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Character recognition apparatus comprising means for scanning a character and producing signal data in response to a character scanned, means responsive to signal data from said scanning means for producing signals representative of scanned character line increments, storage means, a storage matrix, means for advancing line increment signals from said producing means to said storage means, means for advancing said line increment signals from said storage means to positions in said storage matrix, and means responsive to the positions of line increment signals in said storage matrix for recognizing a character scanned.

2. Apparatus as defined in claim 1 wherein said two advancing means are controlled by timing means and operation of said timing means is initiated by operation of said line increment signal producing means.

3. Apparatus as defined in claim 1 wherein said two advancing means are controlled by timing means to advance said signals to said storage means at successive spaced times and to advance said signals to said matrix after each of said times.

4. Apparatus as defined in claim 1 wherein said two advancing means are controlled by timing means to advance said signals to said storage means at successive spaced times and to advance said signals to said matrix after each of said times with the interval between the first time of production of signals and the subsequent first time of advance of signals to said matrix being greater than the interval between the last time of production of signals and the subsequent last time of advance of signals to said matrix during a character recognition operation.

5. Character recognition apparatus comprising multi-channel means for scanning a character, multi-channel means responsive to signal data from channels of said scanning means for producing, in corresponding channels, signals representative of scanned character line increments, multi-channel storage means, a multi-channel storage matrix, means for successively advancing successive line increment signals from said producing means to corresponding channels of said storage means, means for advancing said successive line increment signals from said storage means to positions in corresponding channels in said storage matrix, and means responsive to the positions of line increment signals in said storage matrix for recognizing a character scanned.

6. Apparatus as defined in claim 5 wherein said two advancing means are controlled by timing means and operation of said timing means is initiated by operation of said line increment signal producing means.

7. Apparatus as defined in claim 5, wherein said two advancing means are controlled by timing means and operation of said timing means is initiated by the occurrence of two simultaneously existing line increment signals.

8. Apparatus as defined in claim 5 wherein said two advancing means are controlled by timing means to advance said signals to said storage means at successive spaced times and to advance said signals to said matrix after each of said times.

9. Apparatus as defined in claim 5 wherein said two advancing means are controlled by timing means to advance said signals to said storage means at successive spaced times and to advance said signals to said matrix after each of said times with the interval between the first time of production of signals and the subsequent first time of advance of signals to said matrix being greater than the interval between the last time of production of signals and the subsequent last time of advance of signals to said matrix during a character recognition.

10. Character recognition apparatus comprising multi-channel means for scanning a character, multi-channel storage means, a multi-channel storage matrix, timing means, means responsive to signals from said scanning means indicative of a character being scanned for controlling operation of said timing means, means responsive to said timing means for advancing successive signal data from channels of said scanning means to corresponding channels of said storage means and for advancing successive signal data from channels of said storage means to successive positions in corresponding channels in said storage matrix, and means responsive to the positions of data in said storage matrix resulting from the scanning of a character for recognizing the character scanned.

11. Character recognition apparatus comprising means for non-linearly energizing character forming areas, means for scanning said energized areas and producing non-linear outputs in response thereto, means responsive to said non-linear outputs for signalling the scanning of incremental lengths of character forming areas, storage means, a storage matrix, means for advancing successive incremental length signals from said signalling means to said storage means, means for advancing said successive incremental length signals from said storage means to positions in said storage matrix, and means responsive to the positions of incremental length signals in said storage matrix for recognizing a character scanned.

12. Apparatus as defined in claim 11 wherein said output responsive means includes integrating means producing, upon integration to a predetermined threshold value, said signalling of the sensing of an incremental length of a character forming area.

13. Apparatus as defined in claim 11 wherein said two advancing means are controlled by timing means to advance said incremental length signals to said storage means at successive spaced times following the signalling of each incremental character length and to advance said incremental length signals to said matrix after each of said times.

14. Apparatus as defined in claim 11 wherein said output responsive means includes means for producing a linear wave pulse extending during scanning of a character forming area and means responsive to said pulse for signalling of the scanning of incremental lengths of character forming areas.

15. Apparatus as defined in claim 11 wherein said output responsive means includes means for producing a linear wave pulse extending during scanning of a character forming area and integrating means operative during linear wave signal intervals for producing upon integration of a said linear wave pulse to a predetermined threshold value said signalling of the sensing of incremental lengths of character forming areas.

16. Apparatus as defined in claim 11 wherein said energizing means alternatingly energizes said character forming areas and said output responsive means includes means for producing a square wave pulse extending during scanning of a character forming area and means responsive to said pulse for signalling of the scanning of incremental lengths of character forming areas.

17. Apparatus as defined in claim 11 wherein said output responsive means includes means for producing a linear wave pulse extending during scanning of each character forming area and of uniform amplitude for all character forming areas, and means responsive to said pulse for signalling of the scanning of incremental lengths of character forming areas.

18. Character recognition apparatus comprising means for scanning character forming areas and producing outputs in response thereto, means responsive to said outputs for producing a signal extending during scanning of a character forming area, integrating means operative for the duration of said signals for producing upon integration to a threshold a signal indicating the scanning of an incremental length of a character forming area, means responsive to character incremental length signals for recognizing a character scanned, means for advancing incremental length signals to said recognizing means, and means starting operation of said integrating means upon the onset of a said character forming area responsive signal, stopping operation of said integrating means upon the ending of a said character forming area responsive signal and restarting operation of said integrating means after advance of a said incremental length signal to said recognizing means during continuance of a said character forming area responsive signal.

19. Apparatus as defined in claim 18 including means responsive to operation of said integrating means controlling operation of said starting, stopping and restarting means.

20. Character recognition apparatus comprising means for scanning character forming areas and producing outputs in response thereto, means responsive to said outputs for producing signals indicating the scanning of incremental lengths of a character forming area, storage means, a storage matrix, means for advancing successive incremental length signals to said storage means, means for advancing said successive incremental length signals from said storage means to positions in said storage matrix, means responsive to the positions of incremental length signals in said storage matrix for recognizing a character scanned, and means starting operation of said incremental length signal producing means upon the onset of a said character forming area responsive output, stopping operation of said incremental length signal producing means upon the ending of a said character forming area responsive output and restarting operation of said incremental length signal producing means after advance of a said incremental length signal to said recognizing means during continuance of a said character forming area responsive output.

21. Apparatus as defined in claim 20 including means responsive to operation of said incremental length signal reproducing means for controlling operation of said advancing means and said starting, stopping and restarting means.

22. Character recognition apparatus comprising means for scanning character forming areas and producing outputs in response thereto, means responsive to said outputs for producing a signal extending during scanning of a character forming area, integrating means operative for the duration of said signals for producing upon integration to a threshold a signal indicating the scanning of an incremental length of a character forming area, storage means, a storage matrix, means for advancing successive incremental length signals to said storage means, means for advancing said successive incremental length signals from said storage means to positions in said storage matrix, means responsive to the positions of incremental length signals in said storage matrix for recognizing a character scanned, and means starting operation of said integrating means upon the onset of a said character forming area responsive signal, stopping operation of said integrating means upon the ending of a said character forming area responsive signal and restarting operation of said integrating means after advance of a said incremental length signal to said recognizing means during continuance of a said character forming area responsive signal.

23. Apparatus as defined in claim 22 including means responsive to operation of said integrating means controlling operation of said advancing means and said starting, stopping and restarting means.

24. Character recognition apparatus comprising character reading means and character identifying means, said character reading means comprising multi-channel means, each channel including means for scanning a segment of a character and producing outputs in response to character forming areas scanned, means responsive to said outputs for producing successive signals indicating incremental lengths of character forming areas of segments scanned and means for advancing said signals to said character identifying means, and said character identifying means comprising a multi-channel matrix of storage means selectively settable by said signals advanced from each channel and providing a matrix representation of a character scanned, means for rotating a character representation through the matrix and means operative in less than the total number of said rotated positions responsive to combinations of settings of said storage means for producing an output indicative of a character scanned.

25. Apparatus as defined in claim 24 wherein said responsive means is operative only when the upper or lower row of matrix storage means are unset by said signals.

26. Apparatus as defined in claim 24 wherein operation of said responsive means, is controlled by its previous operation.

27. Apparatus as defined in claim 24 wherein said responsive means is operable during all rotated positions in which the upper or lower row of matrix storage means are unset by said signals for the first character to be recognized in a row of characters on a document and, for characters following said first character, is operable during only a restricted number of rotated positions in which the upper or lower row of matrix storage means are unset by said signals immediately preceding and succeeding the rotated position at which said first character was recognized.

References Cited in the file of this patent

UNITED STATES PATENTS

| | | |
|---|---|---|
| 2,738,499 | Sprick | Mar. 13, 1956 |
| 2,894,247 | Relis | July 7, 1959 |
| 2,924,812 | Merritt et al. | Feb. 9, 1960 |
| 2,932,006 | Glauberman | Aug. 5, 1960 |
| 2,961,649 | Eldredge et al. | Nov. 22, 1960 |
| 3,025,495 | Endres | Mar. 15, 1962 |

FOREIGN PATENTS

| | | |
|---|---|---|
| 786,466 | Great Britain | Nov. 20, 1957 |

OTHER REFERENCES

"Character Recognition," by Glauberman, "Electronics," February 1956, pp. 132 to 136.